(12) United States Patent
Qi et al.

(10) Patent No.: US 8,259,874 B1
(45) Date of Patent: Sep. 4, 2012

(54) APPARATUS AND METHOD FOR OPTIMIZATION OF CARRIER RECOVERY IN A RECEIVER OF A COMMUNICATION SYSTEM

(75) Inventors: Ronggang Qi, Ashburn, VA (US); Christopher D. Gregory, Potomac Falls, VA (US); Baoyan Ding, Rockville, MD (US); Shanmugavel Sivagnanavelu, Bristow, VA (US)

(73) Assignee: VT Idirect, Inc., Herndon, VA (US)

( * ) Notice: Subject to any disclaimer, the term of this patent is extended or adjusted under 35 U.S.C. 154(b) by 573 days.

(21) Appl. No.: 12/533,741

(22) Filed: Jul. 31, 2009

Related U.S. Application Data

(60) Provisional application No. 61/129,957, filed on Aug. 1, 2008.

(51) Int. Cl.
*H03D 1/00* (2006.01)
(52) U.S. Cl. ....................................... 375/343
(58) Field of Classification Search .................. 375/324, 375/343, 365
See application file for complete search history.

(56) References Cited

U.S. PATENT DOCUMENTS

| | | | | |
|---|---|---|---|---|
| 5,272,446 A | * | 12/1993 | Chalmers et al. | 329/304 |
| 6,134,286 A | * | 10/2000 | Chennakeshu et al. | 375/365 |
| 2012/0038832 A1 | * | 2/2012 | Kim et al. | 348/723 |

* cited by examiner

*Primary Examiner* — Leon-Viet Nguyen
(74) *Attorney, Agent, or Firm* — Oblon, Spivak, McClelland, Maier & Neustadt, L.L.P.

(57) ABSTRACT

An apparatus and method to optimize recovery of the carrier frequency performs independent optimization of frequency capture range and carrier frequency estimation accuracy. A multi-correlator selects a frequency-shifted version of a signal of interest, extracted from a received signal, to output a coarse frequency-shifted version of the signal of interest. A fine frequency estimator shifts a frequency of the coarse frequency-shifted version of the signal of interest, based on a frequency corresponding to the spectral peak of the coarse frequency-shifted version of the signal of interest, and generates a fine frequency-shifted version of the signal of interest. A fine frequency estimator generates an intermediate frequency estimate and a plurality of phase estimates, based on the coarse frequency-shifted version of the signal of interest, resolves phase ambiguities in the plurality of phase estimates based on the intermediate frequency estimate, and generates a fine frequency-shifted version of the signal of interest.

58 Claims, 14 Drawing Sheets

A': RECEIVED SIGNAL
A: SIGNAL OF INTEREST
B: COARSE FREQUENCY-SHIFTED VERSION OF THE SIGNAL OF INTEREST
C: FINE FREQUENCY-SHIFTED VERSION OF THE SIGNAL OF INTEREST
D: DECODED DATA

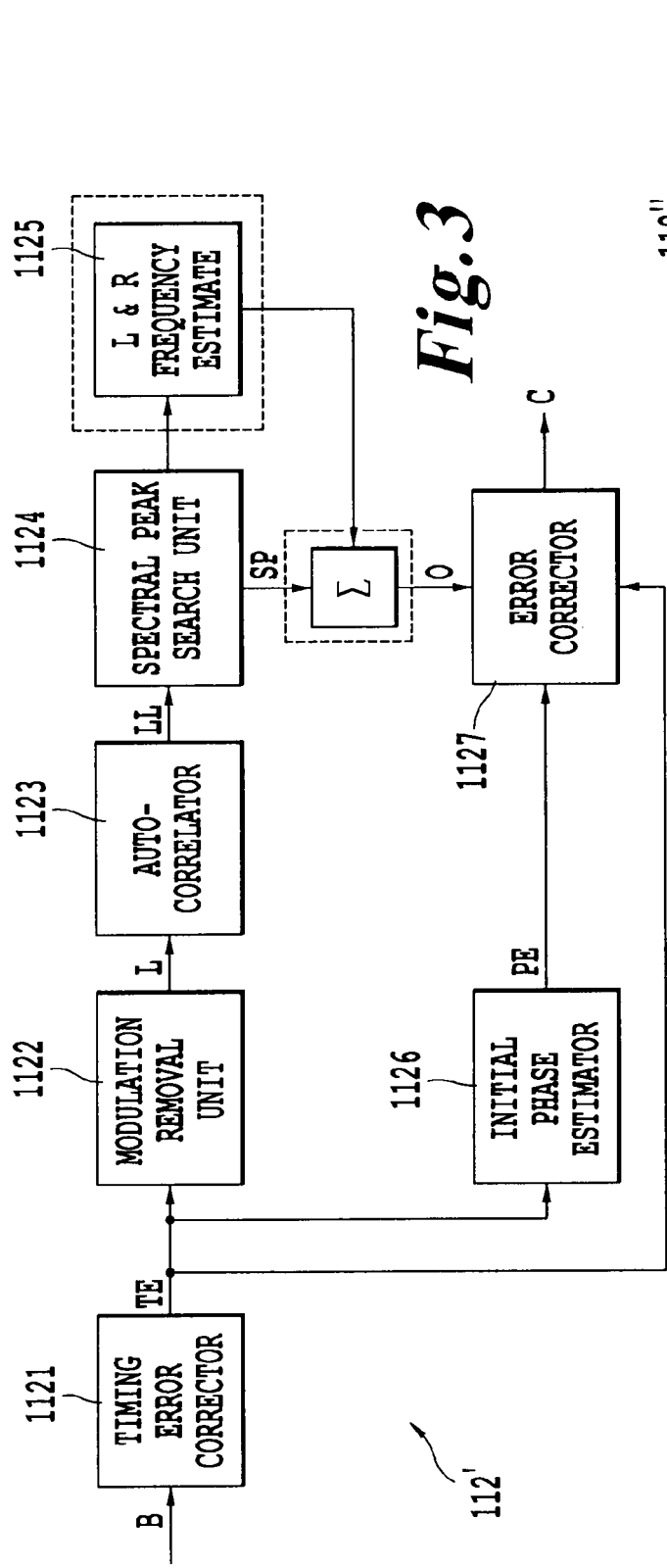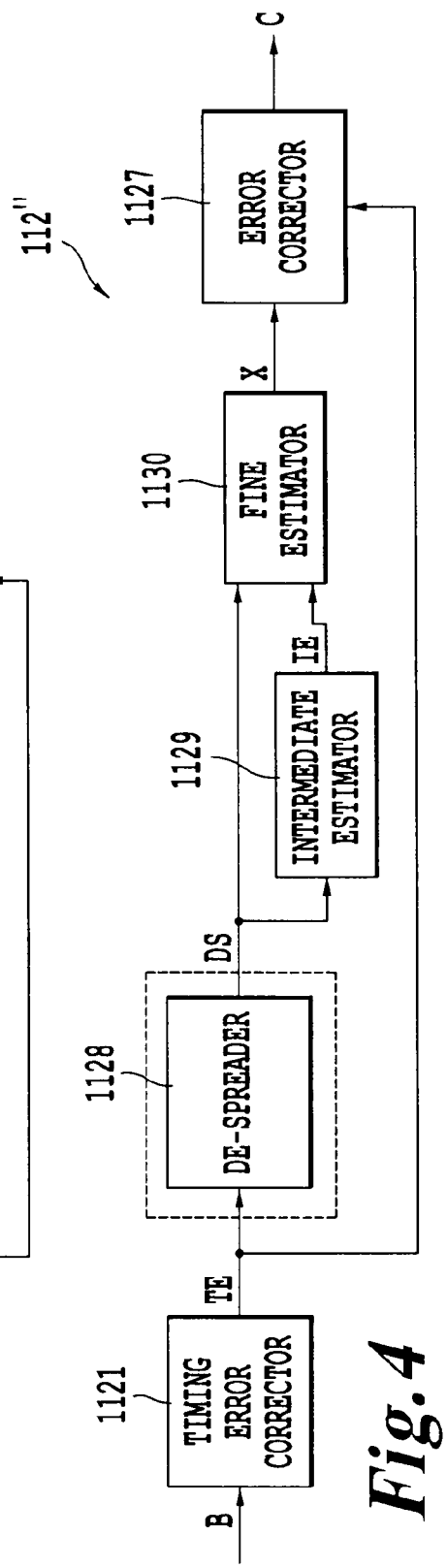

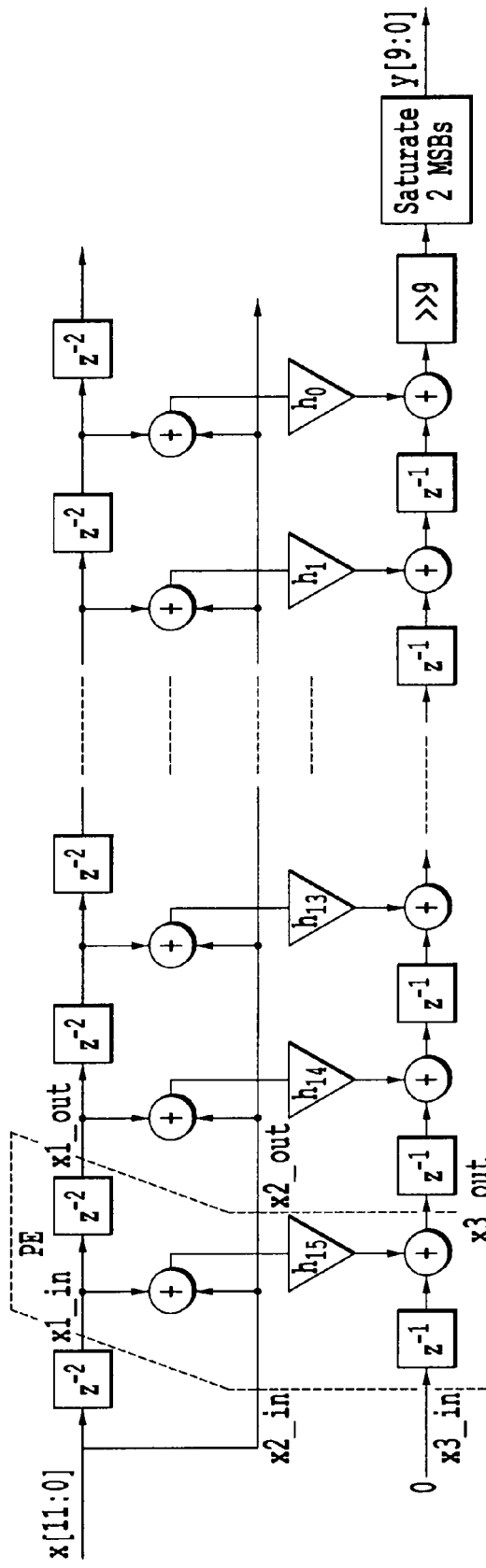
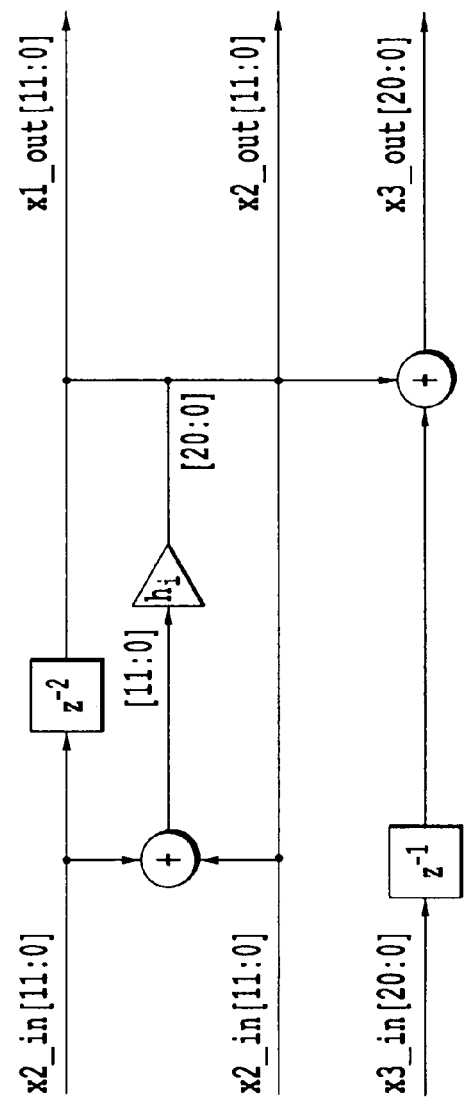
*Fig. 8(a)*
*Fig. 8(b)*

*Auto-correlator*

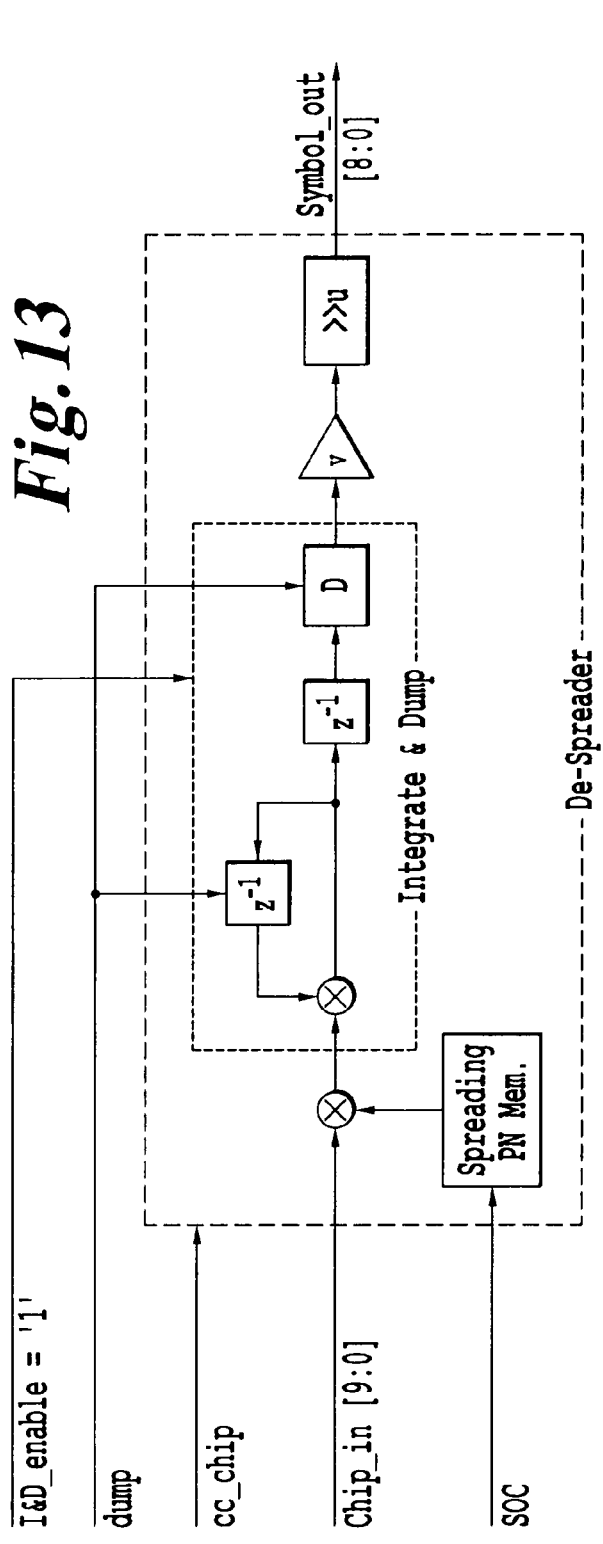

APPARATUS AND METHOD FOR OPTIMIZATION OF CARRIER RECOVERY IN A RECEIVER OF A COMMUNICATION SYSTEM

CROSS-REFERENCE TO RELATED APPLICATIONS

This application claims the benefit under 35 U.S.C. §119(e) of U.S. Provisional application No. 61/129,957, filed on Aug. 1, 2008, the entire contents of which are incorporated herein by reference.

BACKGROUND OF THE INVENTION

1. Field of the Invention

The present invention relates generally to optimization of recovery of a carrier frequency of a received signal in a communication system, and in particular, to an apparatus and method for optimizing carrier recovery in a receiver of a communication system.

2. Description of the Related Art

A receiver in a communication system processes a received information signal, which is modulated and transmitted using a carrier frequency, to decode data from the information signal. Because of numerous phenomena, such as movement of the receiver and/or transmitter or distance between the transmitter and receiver, for example, the carrier frequency of the transmitted signal can appear shifted at the receiver. The process of finding the frequency at the receiver that corresponds with the transmitted signal frequency is called carrier recovery.

The high frequency error tolerance or frequency capture range establishes the upper bound for the robustness of the receiver, while a low frequency estimation variance or high carrier frequency estimation accuracy increases the carrier-to-noise ratio and the quality of the decoded signal.

Conventional receiver systems balance the need for high frequency capture range and high carrier frequency estimation accuracy, and, in a conventional system, it may be necessary to improve one of high frequency capture or high carrier frequency estimation accuracy at the expense of the other.

SUMMARY OF THE INVENTION

The present invention is directed to increasing the overall robustness of a receiver system by allowing independent optimization of frequency capture range and carrier frequency estimation accuracy.

An object of the invention is to provide a novel receiver for a communication system, the receiver comprising a matched filter configured to extract a signal of interest from a received signal that includes data that is encoded; a carrier recovery system comprising a multi-correlator configured to generate frequency-shifted versions of the signal of interest, correlate at least two of the frequency-shifted versions of the signal of interest with a predetermined unique word in a plurality of correlators to produce at least two correlation values, and output a selected one of the frequency-shifted versions of the signal of interest as a coarse frequency-shifted version of the signal of interest based on all of the correlation values, and a fine frequency estimator configured to frequency shift the coarse frequency-shifted version of the signal of interest to produce a fine frequency-shifted version of the signal of interest; and a decoder configured to decode the data from the fine frequency-shifted version of the signal of interest.

Another object of the invention is to provide a novel method of decoding data from a received signal in a receiver of a communication system, the method comprising extracting a signal of interest from the received signal; generating a plurality of frequency-shifted versions of the signal of interest by shifting the signal of interest; correlating at least two of the frequency-shifted versions of the signal of interest with a predetermined unique word to generate at least two correlation values; outputting a selected one of the frequency-shifted versions of the signal of interest as a coarse frequency-shifted version of the signal of interest based on all of the correlation values; frequency shifting the coarse frequency-shifted version of the signal of interest to produce a fine frequency-shifted version of the signal of interest; and decoding the data from the fine frequency-shifted version of the signal of interest.

An additional object of the invention is to provide a novel receiver for a communication system, the receiver comprising a matched filter configured to extract a signal of interest from a received signal that includes data that is encoded; a carrier recovery system comprising means for generating frequency-shifted versions of the signal of interest, correlating at least two of the frequency-shifted versions of the signal of interest with a predetermined unique word in a plurality of correlators to produce at least two correlation values, and outputting a selected one of the frequency-shifted versions of the signal of interest as a coarse frequency-shifted version of the signal of interest based on all of the correlation values, and means for frequency shifting the coarse frequency-shifted version of the signal of interest to produce a fine frequency-shifted version of the signal of interest; and a decoder configured to decode the data from the fine frequency-shifted version of the signal of interest.

Another object of the invention is to provide a novel computer-readable storage medium that stores computer program instructions which, when executed by a computer, cause the computer to execute a method of decoding data from a received signal comprising extracting a signal of interest from the received signal; generating a plurality of frequency-shifted versions of the signal of interest by shifting the signal of interest; correlating at least two of the frequency-shifted versions of the signal of interest with a predetermined unique word to generate at least two correlation values; outputting a selected one of the frequency-shifted versions of the signal of interest as a coarse frequency-shifted version of the signal of interest based on all of the correlation values; frequency shifting the coarse frequency-shifted version of the signal of interest to produce a fine frequency-shifted version of the signal of interest; and decoding the data from the fine frequency-shifted version of the signal of interest.

Another object of the invention is to provide a novel receiver for a communication system, the receiver comprising a matched filter configured to extract a signal of interest from a received signal that includes data that is encoded; a correlator configured to output a coarse frequency-shifted version of the signal of interest based on the signal of interest; a fine frequency estimator configured to frequency shift the coarse frequency-shifted version of the signal of interest to produce a fine frequency-shifted version of the signal of interest, the fine frequency estimator including a spectral peak search unit configured to locate a spectral peak of the coarse frequency-shifted version of the signal of interest, and output a spectral peak frequency corresponding to the spectral peak; and an error corrector configured to correct a frequency of the coarse frequency-shifted version of the signal of interest based on the spectral peak frequency output by the spectral peak search unit, and output the fine frequency-shifted version of the signal of interest, wherein a difference between a carrier frequency of the received signal and a frequency of the fine frequency-shifted version of the signal of interest is less than a difference between the carrier frequency of the received signal and a frequency of the coarse frequency-shifted version of the signal of interest; and a decoder configured to decode the data from the fine frequency-shifted version of the signal of interest.

An additional object of the invention is to provide a novel method of decoding data from a received signal in a receiver of a communication system, the method comprising extracting a signal of interest from the received signal; generating a coarse frequency-shifted version of the signal of interest based on the signal of interest; generating a fine frequency-shifted version of the signal of interest by frequency shifting the coarse frequency-shifted version of the signal of interest, the generating including locating a spectral peak of the coarse frequency-shifted version of the signal of interest, and outputting a spectral peak frequency corresponding to the spectral peak; and correcting a frequency of the coarse frequency-shifted version of the signal of interest based on the spectral peak frequency, and outputting the fine frequency-shifted version of the signal of interest, wherein a difference between a carrier frequency of the received signal and a frequency of the fine frequency-shifted version of the signal of interest is less than a difference between the carrier frequency of the received signal and a frequency of the coarse frequency-shifted version of the signal of interest; and decoding the data from the fine frequency-shifted version of the signal of interest.

Another object of the invention is to provide a novel receiver for a communication system, the receiver comprising a matched filter configured to extract a signal of interest from a received signal that includes data that is encoded; a correlator configured to output a coarse frequency-shifted version of the signal of interest based on the signal of interest; a fine frequency estimator configured to frequency shift the coarse frequency-shifted version of the signal of interest to produce a fine frequency-shifted version of the signal of interest, the fine frequency estimator including means for locating a spectral peak of the coarse frequency-shifted version of the signal of interest, and outputting a spectral peak frequency corresponding to the spectral peak; and means for correcting a frequency of the coarse frequency-shifted version of the signal of interest based on the spectral peak frequency output by the spectral peak search unit, and outputting the fine frequency-shifted version of the signal of interest, wherein a difference between a carrier frequency of the received signal and a frequency of the fine frequency-shifted version of the signal of interest is less than a difference between the carrier frequency of the received signal and a frequency of the coarse frequency-shifted version of the signal of interest; and a decoder configured to decode the data from the fine frequency-shifted version of the signal of interest.

Another object of the invention is to provide a novel computer-readable storage medium that stores computer program instructions which, when executed by a computer, cause the computer to execute a method of decoding data from a received signal comprising extracting a signal of interest from the received signal; generating a coarse frequency-shifted version of the signal of interest based on the signal of interest; generating a fine frequency-shifted version of the signal of interest by frequency shifting the coarse frequency-shifted version of the signal of interest, the generating including locating a spectral peak of the coarse frequency-shifted version of the signal of interest, and outputting a spectral peak frequency corresponding to the spectral peak; and correcting a frequency of the coarse frequency-shifted version of the signal of interest based on the spectral peak frequency, and outputting the fine frequency-shifted version of the signal of interest, wherein a difference between a carrier frequency of the received signal and a frequency of the fine frequency-shifted version of the signal of interest is less than a difference between the carrier frequency of the received signal and a frequency of the coarse frequency-shifted version of the signal of interest; and decoding the data from the fine frequency-shifted version of the signal of interest.

An additional object of the invention is to provide a novel receiver for a communication system, the receiver comprising a matched filter configured to extract a signal of interest from a received signal that includes data that is encoded; a correlator configured to output a coarse frequency-shifted version of the signal of interest based on the signal of interest; a fine frequency estimator configured to frequency shift the coarse frequency-shifted version of the signal of interest to produce a fine frequency-shifted version of the signal of interest, the fine frequency estimator including an intermediate frequency estimator configured to output an intermediate frequency estimate based on a frequency corresponding to a spectral peak of the coarse frequency-shifted version of the signal of interest; a plurality of phase estimators configured to correlate the coarse frequency-shifted version of the signal of interest with a plurality of unique words over a predetermined correlation period, generate a plurality of correlation values corresponding with each of the plurality of unique words, and generate a plurality of phase estimates based on a plurality of peak correlation values, each peak correlation value corresponding with one of the plurality of unique words; a fine frequency estimator configured to generate a fine frequency estimate of a carrier frequency of the received signal based on the intermediate frequency estimate and the plurality of phase estimates; and an error corrector configured to correct a frequency of the coarse frequency-shifted version of the signal of interest based on the fine frequency estimate of the carrier frequency of the received signal, and output the fine frequency-shifted version of the signal of interest, wherein a difference between the carrier frequency and a frequency of the fine frequency-shifted version of the signal of interest is less than a difference between the carrier frequency and a frequency of the coarse frequency-shifted version of the signal of interest; and a decoder configured to decode the data from the fine frequency-shifted version of the signal of interest.

Another object of the invention is to provide a novel method of decoding data from a received signal in a receiver of a communication system, the method comprising extracting a signal of interest from the received signal; generating a coarse frequency-shifted version of the signal of interest based on the signal of interest; generating a fine frequency-shifted version of the signal of interest by frequency shifting the coarse frequency-shifted version of the signal of interest, the generating including generating an intermediate frequency estimate based on a frequency corresponding to a spectral peak of the coarse frequency-shifted version of the signal of interest; correlating the coarse frequency-shifted version of the signal of interest with a plurality of unique words over a predetermined correlation period, generating a plurality of correlation values corresponding with each of the plurality of unique words, and generating a plurality of phase estimates based on a plurality of peak correlation values, each peak correlation value corresponding with one of the plurality of unique words; generating a fine frequency estimate of a carrier frequency of the received signal based on the intermediate frequency estimate and the plurality of phase estimates using a frequency estimate through phase estimate method; and correcting a frequency of the coarse frequency-shifted version of the signal of interest based on the fine frequency estimate of the carrier frequency of the received signal, and outputting the fine frequency-shifted version of the signal of interest, wherein a difference between the carrier frequency and a frequency of the fine frequency-shifted version of the signal of interest is less than a difference between the carrier frequency and a frequency of the coarse frequency-shifted version of the signal of interest; and decoding the data from the fine frequency-shifted version of the signal of interest.

Another object of the invention is to provide a novel receiver for a communication system, the receiver comprising a matched filter configured to extract a signal of interest from a received signal that includes data that is encoded; a correlator configured to output a coarse frequency-shifted version of the signal of interest based on the signal of interest; a fine frequency estimator configured to frequency shift the coarse frequency-shifted version of the signal of interest to produce a fine frequency-shifted version of the signal of interest, the fine frequency estimator including means for outputting an intermediate frequency estimate based on a frequency corresponding to a spectral peak of the coarse frequency-shifted version of the signal of interest; means for correlating the coarse frequency-shifted version of the signal of interest with a plurality of unique words over a predetermined correlation period, generating a plurality of correlation values corresponding with each of the plurality of unique words, and generating a plurality of phase estimates based on a plurality of peak correlation values, each peak correlation value corresponding with one of the plurality of unique words; means for generating a fine frequency estimate of a carrier frequency of the received signal based on the intermediate frequency estimate and the plurality of phase estimates; and means for correcting a frequency of the coarse frequency-shifted version of the signal of interest based on the fine frequency estimate of the carrier frequency of the received signal, and outputting the fine frequency-shifted version of the signal of interest, wherein a difference between the carrier frequency and a frequency of the fine frequency-shifted version of the signal of interest is less than a difference between the carrier frequency and a frequency of the coarse frequency-shifted version of the signal of interest; and a decoder configured to decode the data from the fine frequency-shifted version of the signal of interest.

Another object of the invention is to provide a novel computer-readable storage medium that stores computer program instructions which, when executed by a computer, cause the computer to execute a method of decoding data from a received signal comprising extracting a signal of interest from the received signal; generating a coarse frequency-shifted version of the signal of interest based on the signal of interest; generating a fine frequency-shifted version of the signal of interest by frequency shifting the coarse frequency-shifted version of the signal of interest, the generating including generating an intermediate frequency estimate based on a frequency corresponding to a spectral peak of the coarse frequency-shifted version of the signal of interest; correlating the coarse frequency-shifted version of the signal of interest with a plurality of unique words over a predetermined correlation period, generating a plurality of correlation values corresponding with each of the plurality of unique words, and generating a plurality of phase estimates based on a plurality of peak correlation values, each peak correlation value corresponding with one of the plurality of unique words; generating a fine frequency estimate of a carrier frequency of the received signal based on the intermediate frequency estimate and the plurality of phase estimates using a frequency estimate through phase estimate method; and correcting a frequency of the coarse frequency-shifted version of the signal of interest based on the fine frequency estimate of the carrier frequency of the received signal, and outputting the fine frequency-shifted version of the signal of interest, wherein a difference between the carrier frequency and a frequency of the fine frequency-shifted version of the signal of interest is less than a difference between the carrier frequency and a frequency of the coarse frequency-shifted version of the signal of interest; and decoding the data from the fine frequency-shifted version of the signal of interest.

The foregoing paragraphs have been provided by way of general introduction and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a block diagram of a power spectral density-based (PSD-based) fine frequency estimator in a receiver of a communication system according to an embodiment of the present invention;

FIG. 4 is a block diagram of a frequency-estimation through phase-estimation (FEPE) fine frequency estimator in a receiver of a communication system according to an embodiment of the present invention;

FIGS. 8(*a*) and 8(*b*) are block diagrams of a matched filter according to an embodiment of the present invention;

FIG. 13 is a block diagram of a de-spreader according to an embodiment of the present invention;

FIG. 14 is a block diagram of an intermediate estimator according to an embodiment of the present invention;

DETAILED DESCRIPTION OF THE PREFERRED EMBODIMENTS

Figure 1:
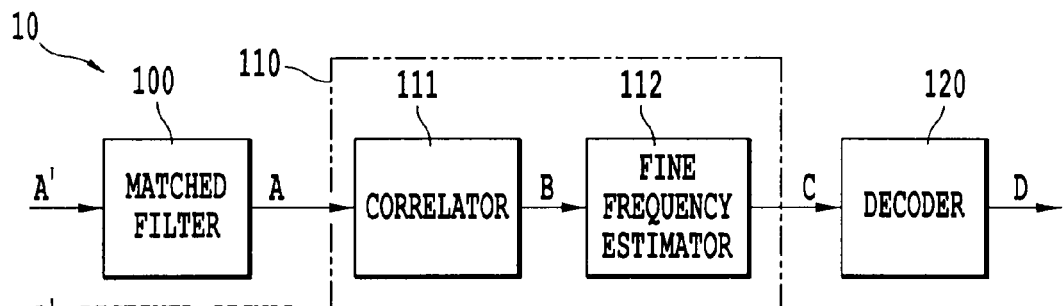
FIG. 1 is a block diagram of a receiver of a communication system according to an embodiment of the present invention.

Referring now to the drawings, wherein like reference numerals designate identical or corresponding parts throughout the several views. Only the portions relevant to the invention are described in detail, because one of ordinary skill in the receiver and received signal processing arts readily understands the details relevant to the other portions of the invention.

FIG. 1 is a block diagram of a receiver 10 of a communication system according to an embodiment of the present invention. The communication system of the non-limiting embodiment communicates an encoded data signal formatted for spread spectrum time division multiple access (SS-TDMA). The receiver 10 includes a matched filter 100 configured to extract a signal of interest A from a received signal A', a carrier recovery unit 110 configured to perform carrier recovery and output the signal of interest, shifted in frequency according to an estimate of the carrier frequency, as a fine frequency-shifted version of the signal of interest C and a decoder 120 configured to decode the fine frequency-shifted version of the signal of interest C to produce a decoded signal D.

According to the present embodiment, the matched filter 100 is a Square Root Raised Cosine (SRRC) filter that filters a received signal A', received by the receiver 10, and outputs a signal of interest A, in a bandwidth of interest, as the input to the carrier recovery unit 110. An example of a matched filter 100 is shown at FIGS. 8(a) and 8(b).

The carrier recovery unit 110 includes a correlator 111 that can be implemented as a single correlator or as a multi-correlator 111', which is configured to perform a coarse estimation of the carrier frequency based on the signal of interest A and output the coarse frequency-shifted version of the signal of interest B, and a fine frequency estimator 112, which is configured to improve the carrier frequency estimate used to generate the coarse frequency-shifted version of the signal of interest B and output the fine frequency-shifted version of the signal of interest C.

The decoder 120 is configured to decode the fine frequency-shifted version of the signal of interest C to retrieve a decoded signal of the transmitted data D. The decoder 120 can be, for example, a turbo product code (TPC) decoder.

By performing a coarse estimation of the carrier frequency with the correlator 111 implemented as a multi-correlator 111' and using the coarse frequency-estimated version of the signal of interest B as the input to the fine frequency estimator 112, the above-described embodiment may allow the frequency offset tolerance (i.e., tolerance for the amount of frequency shift in the received signal from the transmitted signal) to be improved independently of an optimization of a frequency estimation variance (i.e., the accuracy with which carrier frequency is estimated). Additionally, according to the present embodiment, the improvement to the frequency offset tolerance may be made without adversely affecting the frequency estimation variance.

A correlator 111 implemented as a single correlator correlates a signal of interest A with a unique word UW for a predetermined correlation period, corresponding to the aperture window, to produce a plurality of correlator outputs over the predetermined correlation period. When any one of the plurality of correlator outputs over the predetermined correlation period exceeds a predetermined threshold, then a burst is declared, and the signal of interest A is output as the coarse frequency-shifted version of the signal of interest B.

Figure 2:
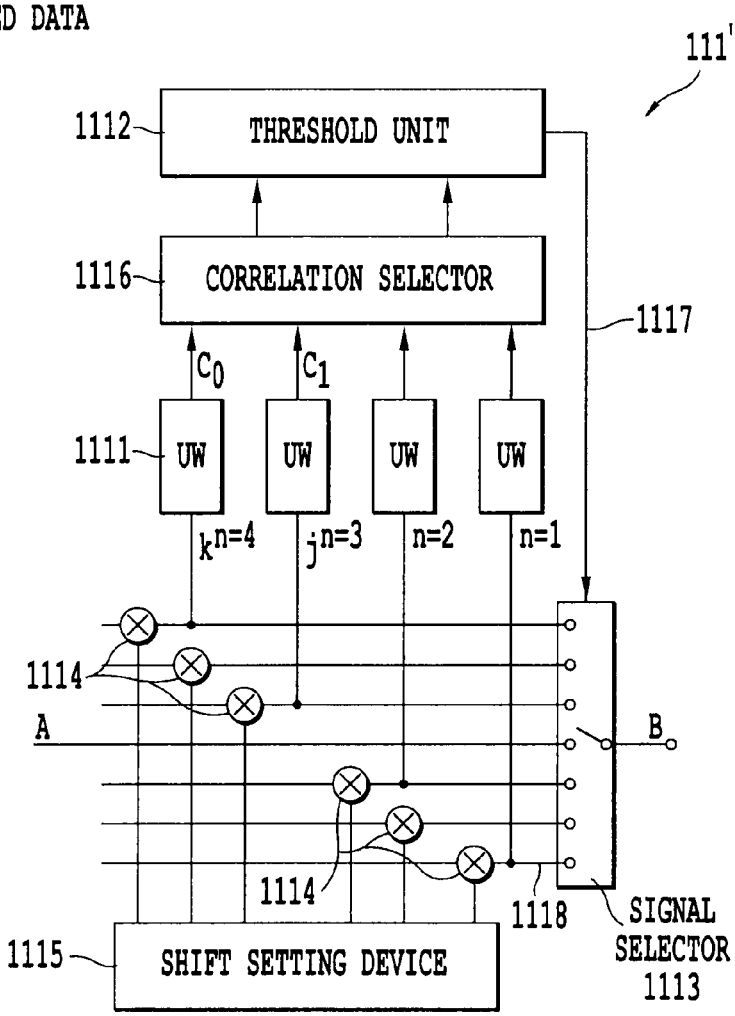
FIG. 2 is a block diagram of a multi-correlator in a receiver of a communication system according to an embodiment of the present invention.

FIG. 2 is a block diagram of a correlator 111 implemented as a multi-correlator 111' in a receiver 10 of a communication system according to an embodiment of the present invention. A signal of interest A is input to the multi-correlator 111' and is shifted, in frequency, by a plurality of shifters 1114 to produce frequency shifted versions of the signal of interest 1118. Each of the shifters 1114 is configured to shift the signal of interest A by a different predetermined amount set by the shift setting device 1115. Correlators 1111 are arranged such that each correlator 1111 correlates a different shifted version of the signal of interest A with the unique word UW for a predetermined correlation period, corresponding to the aperture window, to produce a plurality of correlator output values over the predetermined correlation period. The maximum correlator output value or peak correlation value associated with each correlator (referred to as correlation output of each correlator) is used to determine a coarse frequency-shifted version of the signal of interest. When any one of the correlation outputs, each associated with a different correlator, exceeds a predetermined threshold, a burst is declared.

The unique word UW may be a known word in the received signal A'. For example, if the received signal A' includes binary phase shift keying (BPSK) modulated signal, the unique word UW may be a known word in a preamble of a TDMA burst that includes the BPSK modulated signal. To achieve reliable burst detection, binary Pseudo-random Noise (PN) sequences are widely used as UWs in digital communications. For example, the 32-bit PN sequence [1 1 1 0 1 0 0 0 1 0 1 1 1 0 1 1 1 1 0 0 0 1 0 0 1 0 1 0 0 1 0 0] may been used as the preamble UW in quadrature phase shift keying (QPSK) and 8 phase shift keying (8PSK) upstream communication. A different 52-symbol UW can been used for BPSK upstream communication. Before performing UW correlation with the received preamble, the PN sequence of the UW has to be mapped to BPSK symbols. For instance, the above 32-bit PN sequence can be modulated to 32 BPSK symbols [1 1 1 –1 1 –1 –1 –1 1 –1 1 1 1 –1 1 1 1 1 –1 –1 –1 1 –1 –1 1 1 –1 1 –1 –1 1 –1 –1].

As depicted in the non-limiting example at FIG. 2, six shifters 1114 (i.e., an even number of shifters) shift the signal of interest A by the different predetermined amounts set by the shift setting device 1115: +/−3 Δf, +/−2 Δf, and +/−Δf, respectively. Thus, in this example, three pairs of shifted signals are generated with one of the signals of each pair having a frequency that is increased by an amount, and the other signal of each pair having a frequency that is decreased by the same amount, from the frequency of the signal of interest A. Additionally, according to the present embodiment, resolution of a coarse frequency estimate may be achieved without providing the output of each shifter 1114 to the correlators 1111. In particular, in the example of FIG. 2, only two of the three pairs of shifted signals (i.e., the pairs shifted by +/−3 Δf and +/−Δf) are input to the four correlators

1111. However, based on the output of the correlators 1111, a shift of +/−2 Δf may be selected as the coarse frequency-shifted version of the signal of interest B by the signal selector 1113, as discussed below. In other words, while any one of the seven signals shown at the signal selector 1113 may be selected as the coarse-frequency shifted version of the signal of interest, only four of the seven signals, as shown at FIG. 2, are input to the four correlators 1111.

Thus, the resolution of the coarse frequency estimate may be advantageously increased without requiring a corresponding increase in a number of correlators 1111, thereby reducing the need for additional hardware and/or software resources. An increased frequency resolution of the coarse frequency estimation can lead to more reliable and more accurate fine frequency estimation.

The correlation outputs of the correlators 1111 are provided to a correlation selector 1116, which outputs a highest correlation output C0 having a highest correlation value and a second highest correlation output C1 having a second highest correlation value out of all of the outputs of the correlators 1111. The outputs C0 and C1 of the correlation selector 1116 are provided to a threshold unit 1112.

The threshold unit 1112 determines a shift selection amount 1117 to instruct the signal selector 1113 to select one of the frequency shifted versions of the signal of interest 1118 as the coarse frequency shifted version of the signal of interest B. The threshold unit 1112 determines the shift selection amount 1117 based on C0 and C1 from the correlation selector 1116.

Each of the correlators 1111 has an index i, which is an integer value from 1 to n, where n is the total number of correlators 1111 (e.g., n=4 for FIG. 2). The correlation outputs C0 and C1 are each associated with correlators k and j, respectively, and may be labeled C0($k$) and C1($j$). For example, in FIG. 2, k=4 and j=3. The threshold unit 1112 compares the highest correlation output C0($k$) to the second highest correlation output C1($j$).

When the value of C1($j$) is close to the value of C0($k$) (i.e., when C1($j$) is greater than a predetermined percentage of C0($k$)) the threshold unit 1112 outputs the shift selection amount 1117 to select the frequency shifted signal 1118 having a frequency shift value in between the frequency shift values used to produce the signals correlated by correlators j and k. In other words, in this case, the threshold unit 1112 causes the signal selector 1113 to select the frequency shifted signal 1118 that is shifted by the frequency amount, as follows:

$$((n+1)-k-j)*\Delta f.$$

For example, in FIG. 2, the predetermined percentage may be set to 80%. When the threshold unit 1112 determines that C1>0.8*C0, the threshold unit 1112 causes the signal selector 1113 to select the frequency shifted signal 1118 corresponding to a frequency shift amount of (5−4−3)*Δf=−2 Δf. Thus, when the second highest correlation output value exceeds a predetermined percentage of the highest correlation output value, a shifted signal that was not input to one of the correlators 1111 but, instead, is between two shifted signals that were input to the correlators 1111, is selected as the coarse frequency-shifted version of the signal of interest B.

When the value C1($j$) is not close to the value of C0($k$), the threshold unit 1112 causes the signal selector 1113 to select the frequency shifted signal 1118 that is input to correlator k. In particular, in this case, the threshold unit 1112 causes the signal selector 1113 to select the frequency shifted signal 1118 corresponding to a frequency shift amount of ((n+1)−2k)*Δf.

For example, in FIG. 2, when the value C1($j$) is not greater than the predetermined percentage of C0($k$), the threshold unit 1112 causes the signal selector 1113 to select the shifted signal with a shift of (5−(2*4))*Δf=−3 Δf. Thus, when the second highest correlation output value does not exceed a predetermined percentage of the highest correlation output value, the shifted signal that generated the highest correlation output value is selected as the coarse frequency-shifted version of the signal of interest B.

The discussion about shows that, for a given frequency capture range [−fmax, +fmax], where fmax=n*Δf, and a given number of correlators 1111, n, the resolution of the coarse frequency estimate can be advantageously increased by increasing the number of shifters 1114. Alternatively, for a given resolution of the coarse frequency estimate and a given number of correlators 1111, n, the frequency capture range, [−fmax, +fmax], can be advantageously increased by increasing the number of shifters 1114.

One of ordinary skill will readily appreciate that, although the example of FIG. 2 includes four correlators 1111, n=4, the carrier recovery unit 110 is not limited to having a multi-correlator 111' with only that number of correlators 1111, and alternatively may include any other number of correlators.

Furthermore, if the symbol rate is identified as Rs, in a case with four correlators 1111: 2*Δf=0.78125%*Rs. That is, where fmax=n*Δf is roughly 1.5%*Rs, the frequency shift amount between any two adjacent correlators in the example above is 2*Δf so that 2*Δf=2*fmax/n=fmax/2, for n=4. With the sampling rate of the signal of interest A denoted as Fs=m*Rs, to make the normalized frequency shift step size Δf/Fs of shifters 1114 be represented by an Nb-bit number such that all shift amounts in the example, i.e., indx*Δf/Fs, indx=0, +/−1, +/−2, and +/−3 can be precisely represented by Nb-bit numbers without rounding errors, a simple choice is to quantize Δf/Fs to integer 1 in Nb-bit number space, or, Δf/Fs=½^Nb. Therefore, the normalized frequency shift step size Δf/Rs=m/2^Nb. When m=4 and number of correlators n=4, to make fmax=n*Δf=n*m*Rs/2^Nb close to 1.5%*Rs, Nb can be chosen such that Nb=10 (so that fmax=16/1024*Rs=1.5625%*Rs). Thus, Δf/Rs=4/1024, or 2*Δf=1/128*Rs=0.78125%*Rs.

As shown in FIG. 1, the coarse frequency-shifted version of the signal of interest B is input to the fine frequency estimator 112, which outputs signal C that is a fine frequency-shifted version of the signal of interest. The output signal C is produced by more finely estimating the carrier frequency shift using the fine frequency estimator 112. The output signal C is then decoded by the decoder 120.

The fine frequency estimator 112 can be implemented using a 1-stage power spectral density-based (PSD-based) fine frequency estimator (i.e., "PSD estimator") 112', or a 2-stage enhanced 3-amble fine frequency estimator (i.e., "enhanced 3-amble estimator") 112". An embodiment of the PSD estimator 112' is shown in FIG. 3, and an embodiment of the enhanced 3-amble estimator 112" is shown in FIG. 4.

The 1-stage PSD-based fine frequency estimator 112' includes a fully non-data aided (NDA) frequency estimation. An NDA estimation does not require overhead symbols in the payload, and, thereby, may improve throughput. The 2-stage enhanced 3-amble fine frequency estimator 112" of FIG. 4 implements a 3-amble technique using 3 unique words, one in the preamble and two in the payload. While the 3-amble technique may decrease payload capacity by requiring overhead symbols, the 3-amble technique may perform better with the FEPE approach for high order modulation schemes (e.g., 8PSK) than the NDA method. In terms of frequency capture range, the NDA method can be superior to the 3-amble method, but the 3-amble method can improve the frequency error tolerance range by including an intermediate NDA estimation stage.

FIG. 3 is a block diagram of a PSD-based fine frequency estimator 112' in a receiver 10 of a communication system according to an embodiment of the present invention. The fine frequency estimator 112', depicted at FIG. 3, includes a timing error corrector 1121, a modulation removal unit 1122, an auto-correlator 1123, a binary peak search unit 1124, an optional Luise and Reggiannini (L&R) estimator 1125, an initial phase estimator 1126, and an error corrector 1127.

Figure 9A:
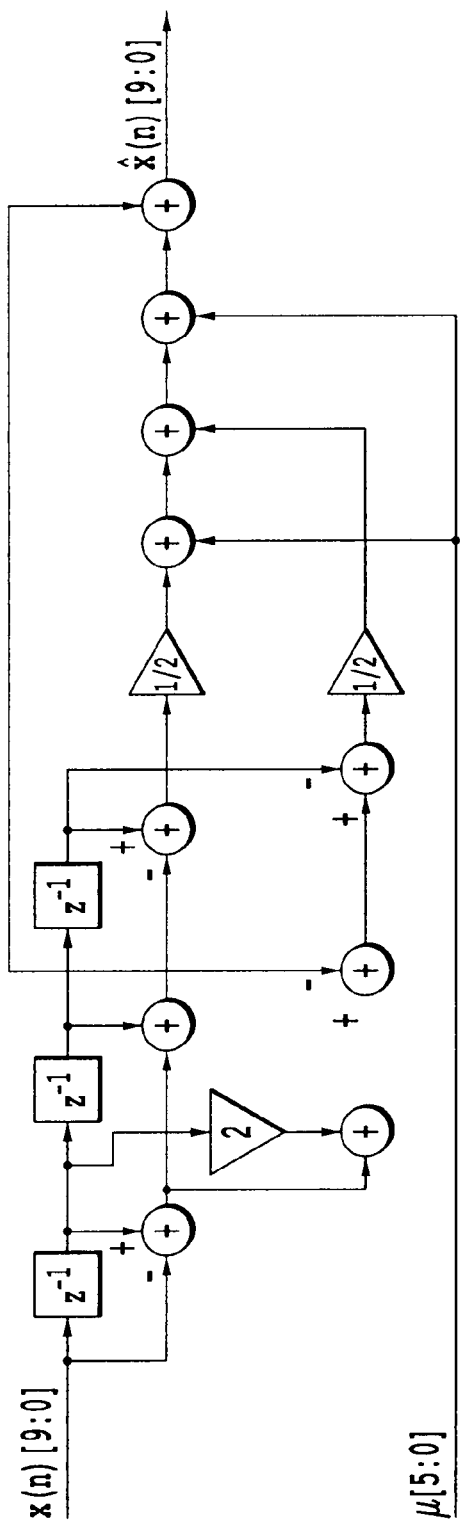
FIGS. 9(*a*) and 9(*b*) are block diagrams of a timing error corrector implemented as a piecewise parabolic interpolator in a Farrow structure according to an embodiment of the present invention.
Figure 9B:
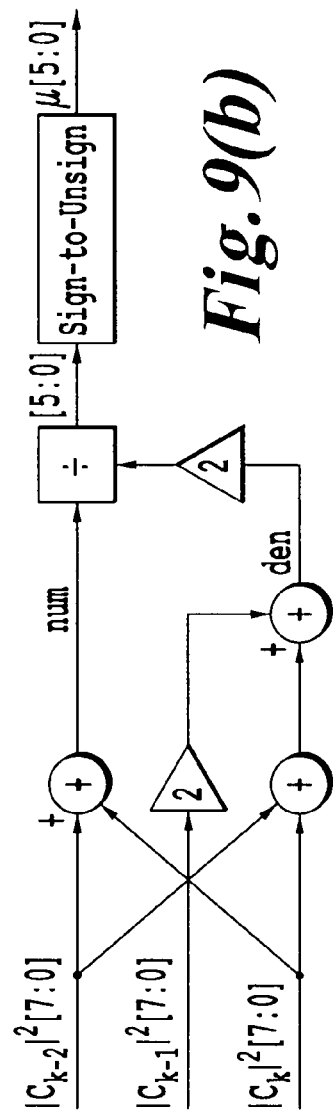

The timing error corrector 1121 is configured to correct a timing error of the coarse frequency-shifted version of the signal of interest B to produce a timing error corrected coarse frequency-shifted version of the signal of interest TE. An example of a timing error corrector 1121 is shown at FIGS. 9(a) and 9(b).

The initial phase estimator 1126 is configured to calculate and output an initial phase estimate PE, which is the phase difference between the peak correlation output of a single correlator or the highest correlation output C0 of the multi-correlator 111', and the nominal constellation position of the preamble, where peak correlation output refers to the peak correlation value in a predetermined correlation period. UW correlation is done by correlating a received BPSK preamble with a local copy of the UW that is BPSK modulated to the real axis. The minimal BPSK constellation position is defined as the phases at which the two BPSK constellation points are expected in the I-Q plane. For instance, 45 and 225 degrees may be the nominal constellation position for BPSK transmission. Therefore, the phase estimate, which is the phase of the correlation peak of the received and local copy of UW (at 0 and 180 degrees) will include not only the wanted initial phase but also a constant offset of 45 degrees due to the phase difference between the nominal constellation and the local UW. As a result, this phase offset should be subtracted from the calculated phase value of UW correlation in order to obtain the estimate of the initial phase.

Figure 10:
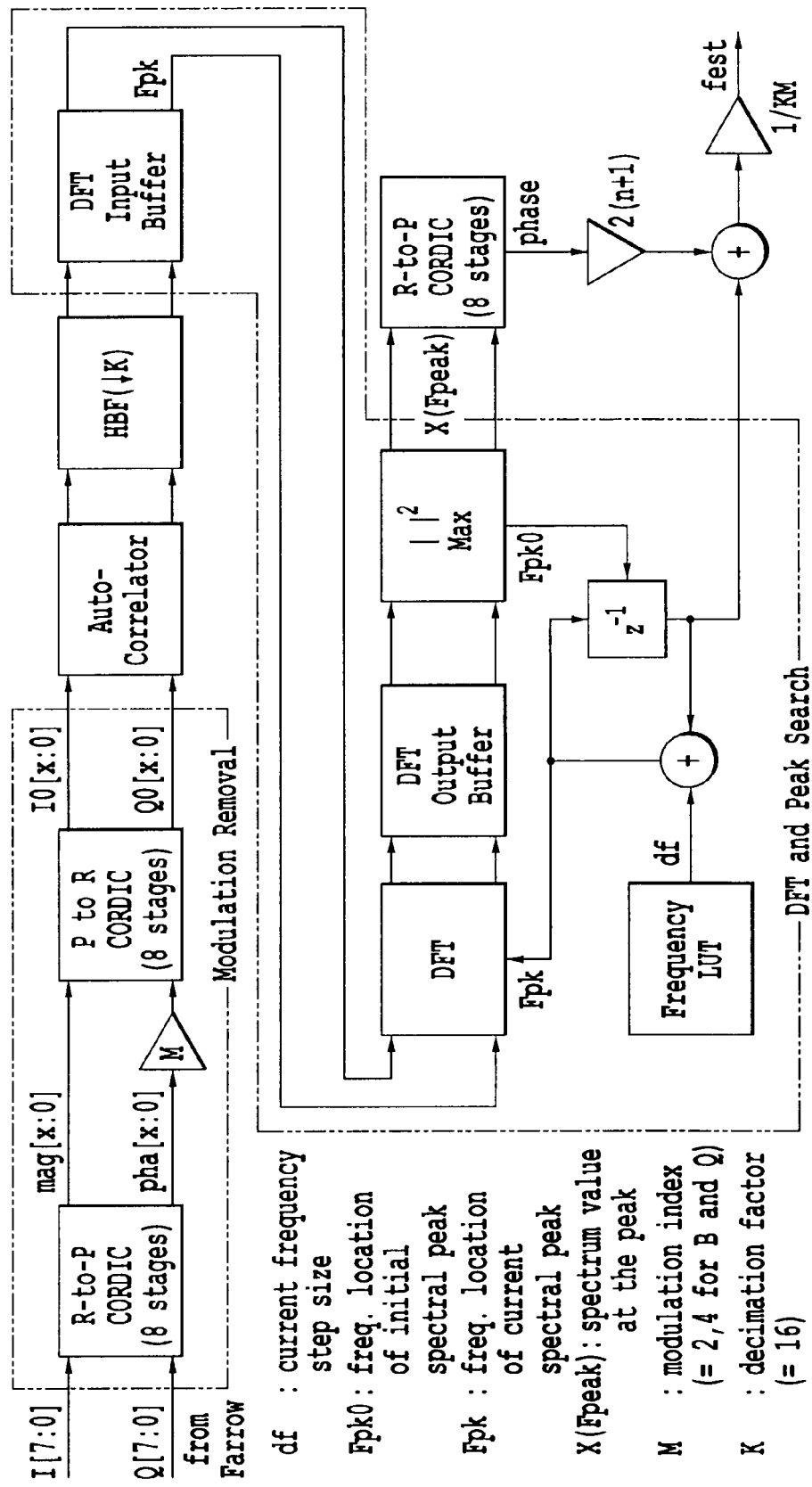
FIG. 10 is a block diagram of a fine frequency estimator, including a modulation removal unit, according to an embodiment of the present invention.

The modulation removal unit 1122 is configured to remove the information-bearing phases of the timing error corrector 1121 output TE, which can be a multiple phase shift keying (MPSK) modulated signal at 1 sample per symbol, and output a modulation removed signal L. The modulation removal unit 1122 can be implemented using one of a number of techniques such as, for example, coordinate rotation digital computer (CORDIC) rectangular-to-polar and polar-to-rectangular converters. An example of a modulation removal unit 1122 in a fine frequency estimator is shown at FIG. 10.

Figure 11:
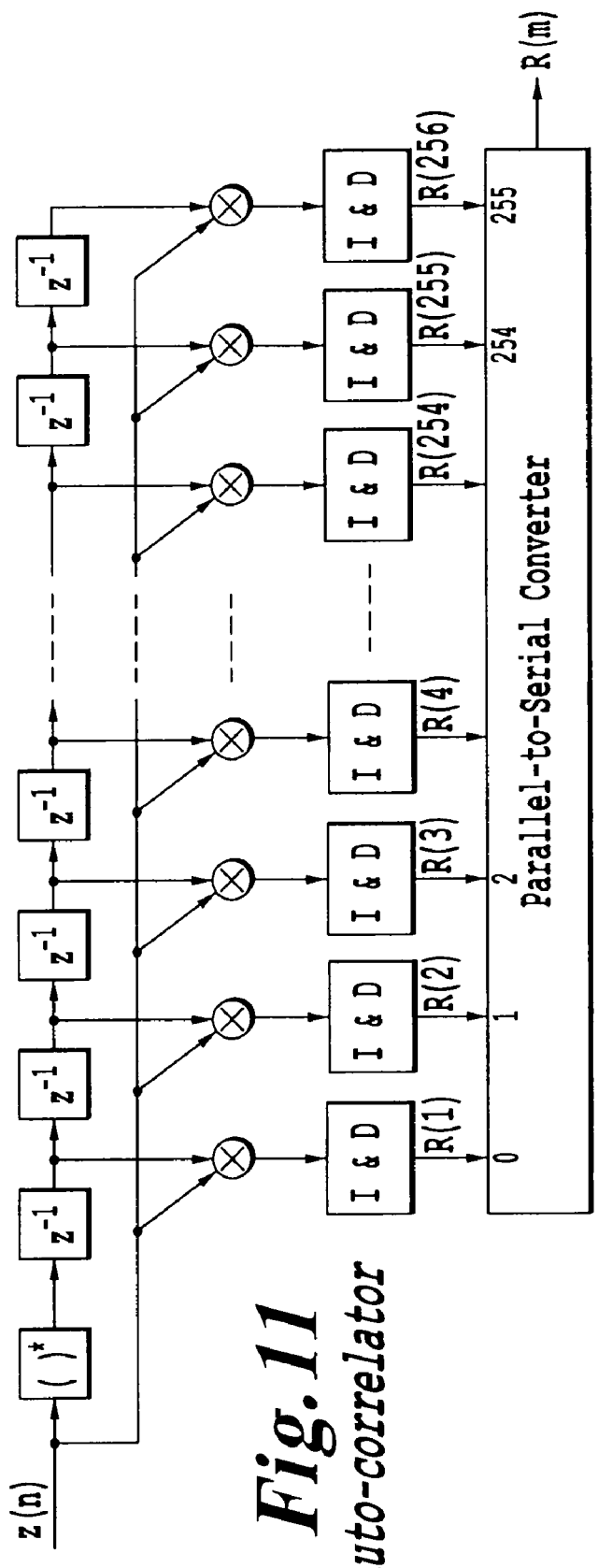
FIG. 11 is a block diagram of an auto-correlator according to an embodiment of the present invention.

The auto-correlator 1123 is configured to auto-correlate the demodulated signal L to produce a signal LL, which is the auto-correlated version of the input signal L. An un-normalized autocorrelation can be used to simplify the calculation of the auto-correlator 1123. An example of an auto-correlator is shown at FIG. 11.

Figure 12:
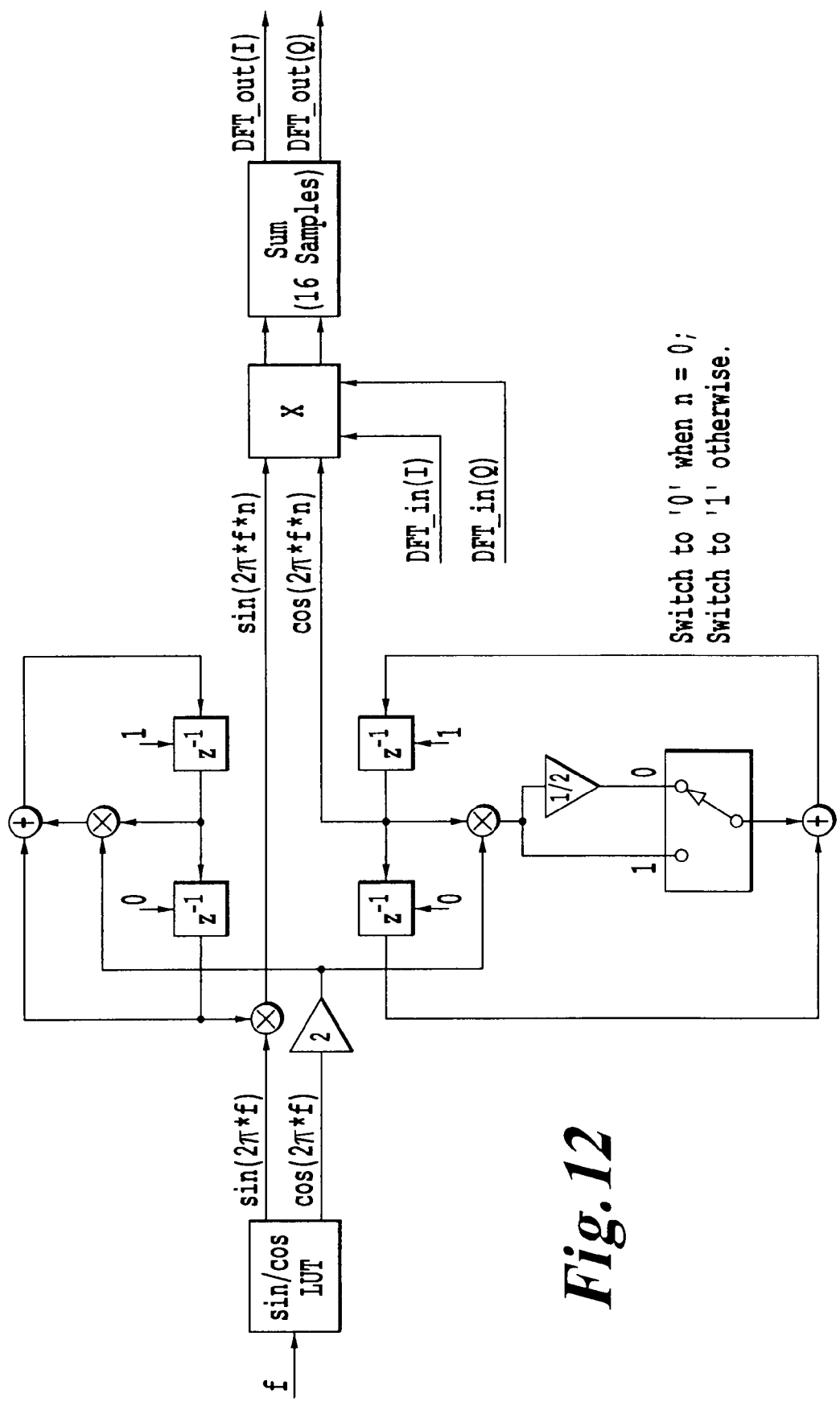
FIG. 12 is a block diagram of the DFT structure according to an embodiment of the present invention.

A spectral peak search unit 1124 outputs a frequency N at which the spectrum of the auto-correlator 1123 output LL is maximum. While a fast Fourier Transform (FFT) is conventionally used to implement a discreet Fourier Transform (DFT) and then compute power spectral density (PSD), the spectral peak search unit 1124 need not be implemented as an FFT because only the spectral peak and location, in frequency, of the PSD are needed. Instead, the spectral peak search unit 1124 can effectively be combined with the DFT through a binary peak searching algorithm. The binary searching algorithm may utilize a coarse peak location, which can be determined with a short DFT. The size of the short DFT can be chosen as a 32-point DFT when the received signal A' is modulated using BPSK or QPSK, for example. FIG. 12 shows an example of a DFT implementation, using a Chebyshev polynomial approximation method, that could be used in conjunction with a spectral peak search unit 1124 such as the one shown at FIG. 10.

An optional L&R estimator 1125 estimates a carrier frequency and outputs an estimated frequency O which is a sum of the estimated frequency and the frequency SP, which is output by the spectral peak search unit 1124. Thus, the fine frequency-shifted version of the signal of interest C, output by the fine frequency estimator 112' of FIG. 3, can have a frequency based on the sum O of the frequency location of the spectral peak SP, output by the spectral peak search unit 1124, and a fine frequency estimate obtained with the L&R estimator 1125.

The L&R estimation becomes unnecessary if the frequency resolution of the DFT is high enough to meet the application requirement for frequency estimation resolution or when the standard deviation of estimated frequency location of the spectral peak SP is comparable to the DFT frequency resolution. The PSD-based frequency estimator can be considered a generalized form of an L&R estimator with the L&R estimator being a special case when the frequency location of the spectral peak is 0 and the decimation factor is 1. The PSD-based frequency estimator extends the frequency tolerance range by overcoming the limitation of the L&R method that the frequency error cannot exceed +/−1/(modulation_index*observation length OL).

The error corrector 1127 receives the timing error-corrected coarse frequency shifted signal of interest, corrects the frequency estimate of the carrier frequency that was used to generate the coarse frequency-shifted version of the signal of interest B based on the frequency location of the spectral peak output by the spectral peak search unit 1124 and, optionally, the frequency estimate of the L&R estimator 1125, and outputs the fine frequency-shifted version of the signal of interest C. The error corrector 1127 can be implemented as a direct digital synthesizer (DDS).

The error corrector 1127 can further correct the phase estimate PE output by the initial phase estimator 1126, in addition to further correcting frequency estimate. The error corrector 1127 can remove the effects of frequency and initial phase errors that prevent correct demodulation of an MPSK modulated signal output as the timing error corrector 1121 output TE. When there is a frequency error, the constellation of signal TE can spin over time. When there exists a constant phase error θ in the signal TE, its constellation can be rotated θ degrees counter-clockwise (or clockwise for negative θ) from the expected nominal constellation position.

FIG. 4 is a block diagram of an enhanced 3-amble estimator 112" in a receiver 10 of a communication system according to an embodiment of the present invention.

The fine frequency estimator 112", depicted at FIG. 4, includes the timing error corrector 1121, a de-spreader 1128, an intermediate estimator 1129, a fine estimator 1130, and the error corrector 1127.

The optional de-spreader 1128, which is used in a spread spectrum communication system, is configured to recover symbols that were transmitted as chips in the received signal A' and output the de-spread signal DS. The de-spreader 1128 recovers the transmitted symbols by performing partial correlations of code-aligned received chips in the timing error-corrected coarse frequency-shifted version of the signal of interest TE with the spreading code that was used at the transmitter. The lengths of the partial correlations correspond to the spreading factor of a direct sequence spread spectrum system according to an embodiment of the present invention.

The de-spreader 1128 can be implemented as an "Integrate and Dump" type accumulator that periodically dumps and resets its content. An example of a de-spreader 1128 is shown at FIG. 13.

The intermediate estimator 1129 operates on the signal DS, which is output by the de-spreader 1128, to output an intermediate estimation of carrier frequency IE. The intermediate estimator 1129 outputs the intermediate estimation IE by improving the carrier frequency estimate used to generate the coarse frequency-shifted version of the signal of interest B and to improve the fine frequency estimate used to generate the fine frequency-shifted version of the signal of interest C. The intermediate estimator 1129 can be implemented as a non-data-aided (NDA) frequency estimator that does not use overhead symbols for the estimation. The intermediate estimator 1129 implemented as a NDA frequency estimator can further be implemented as a maximum likelihood estimator that selects, as the intermediate frequency estimate, the location of the spectral peak using a spectral analyzer such as an FFT. An example of an intermediate estimator is shown at FIG. 14.

Figure 15:
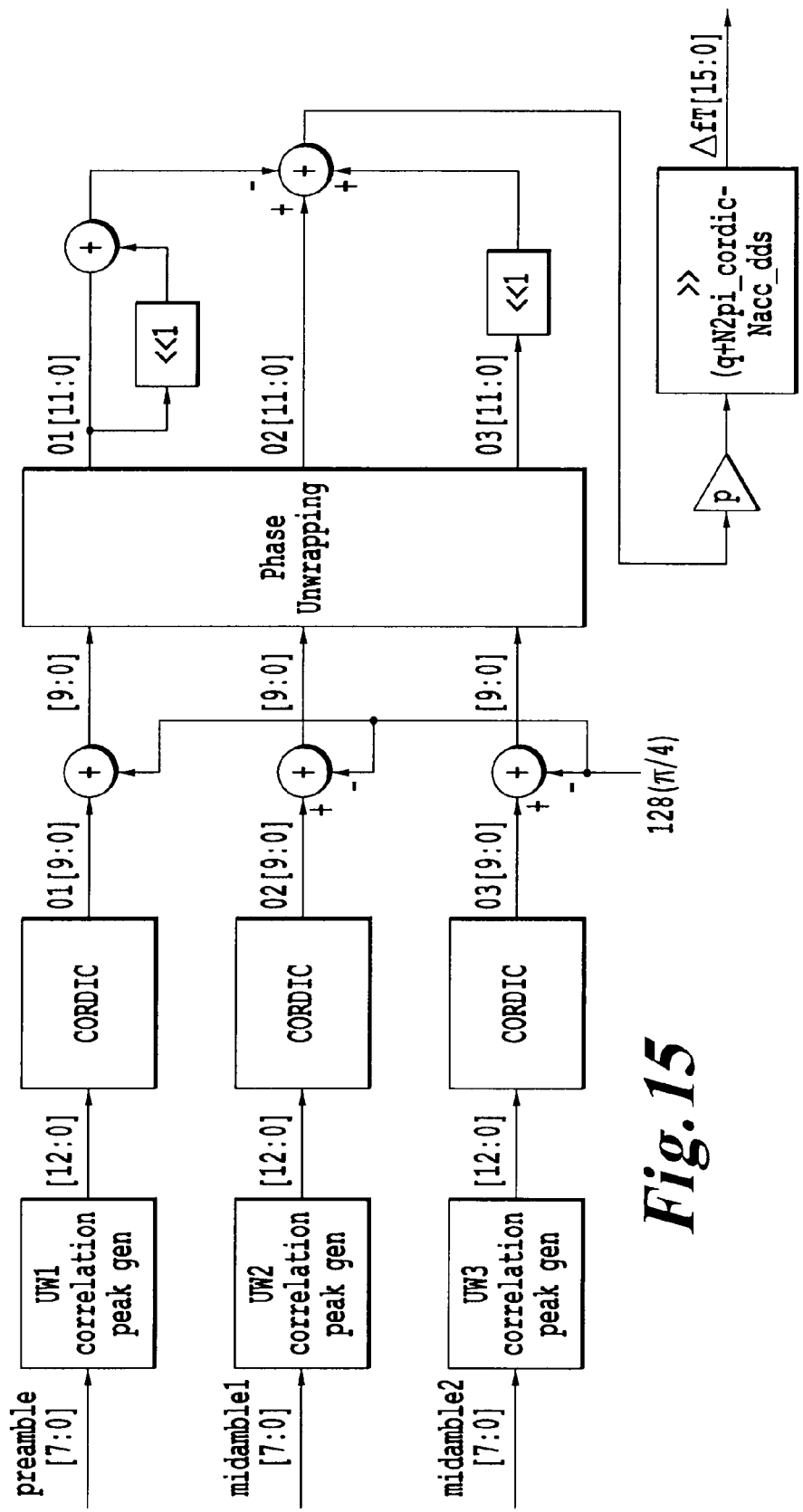
FIG. 15 is a block diagram of a parallel implementation structure of a fine frequency estimator, including the phase estimators, according to an embodiment of the present invention.

The fine estimator 1130 uses the de-spreader 1128 output signal DS to estimate phase at the preamble and the midambles, resolves phase ambiguity by using the intermediate estimation IE output by the intermediate estimator 1129, and outputs a fine frequency estimation X using a frequency estimation through phase estimation (FEPE) technique. The fine estimator 1130 output X is input to the frequency error corrector 1127, along with the timing error-corrected coarse frequency-shifted version of the signal of interest, for output of the fine frequency-shifted version of the signal of interest C, as discussed above. An example of a fine estimator 1130, including the phase estimators, is shown at FIG. 15.

Figures 5, 6:
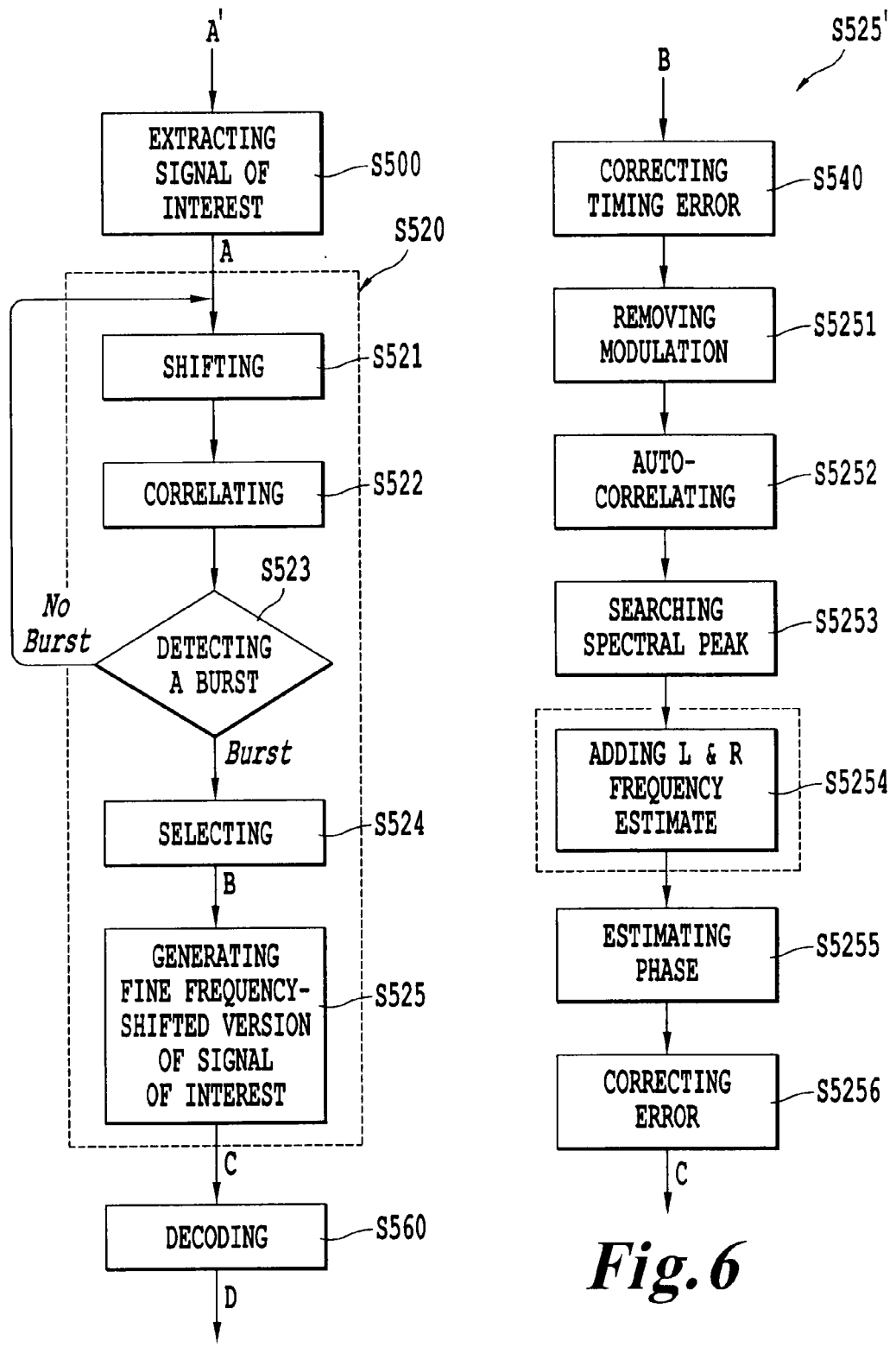
FIG. 5 is a flow diagram of a method of decoding a received signal in a receiver of a communication system according to an embodiment of the present invention.
FIG. 6 is a flow diagram of a PSD-based method of generating a fine frequency estimate in a receiver of a communication system according to an embodiment of the present invention.

FIG. 5 is a flow diagram of a method of decoding a received signal A' in a receiver 10 of a communication system according to an embodiment of the present invention.

As depicted at FIG. 5, step S500 includes extracting a bandwidth limited version of a signal of interest A from a received signal A'. The signal of interest A is processed by a series of steps S520 to output a fine frequency-shifted version of the signal of interest C. The signal C has a frequency representing a fine estimation of the carrier frequency. Step S560 includes decoding the fine frequency-shifted version of the signal of interest C and outputting decoded data D. The steps comprising S520 are detailed next.

In one embodiment, the optional shifting step S521 is not executed. At step S522, correlating includes correlating the signal of interest A with a unique word for a predetermined correlation period, corresponding with aperture window, to generate a plurality of correlator output values over the predetermined correlation period. At step S523, detecting a burst includes determining if any one of the correlator output values over the predetermined correlation period exceeds a predetermined threshold. If even the highest among the correlator output values (ie. the peak correlation value) does not exceed the predetermined threshold, steps S521, S522, and S523 are repeated. At step S524, selecting a coarse frequency-shifted version of the signal of interest includes selecting the signal of interest A when a burst is detected at S523.

In another embodiment, at step S521, the signal of interest A is shifted by a number of different amounts of frequency shifts to generate a plurality of frequency-shifted versions of the signal of interest. Pairs of shifted signals are generated at S521 with one signal of each pair having a frequency that is increased by an amount and the other signal of each pair having a frequency that is decreased by the same amount, from the frequency of the signal of interest A. For example, frequency shifted versions of the signal of interest A are generated with shift amounts of +/−3 Δf, +/−2 Δf, and +/−Δf. In addition, Δf is selected based on the maximum frequency capture range.

Step S522 includes correlating some of the frequency-shifted versions of the signal of interest A output at step S521 with a unique word for a predetermined correlation period, corresponding with aperture window, and outputting a plurality of correlator output values over the predetermined correlation period for each of the correlation-input frequency-shifted versions of the signal of interest A. Not all the frequency-shifted versions of the signal of interest A output at step S521 are required to be correlated at step S522. Instead, for example, only two of three pairs of frequency-shifted signals may be correlated with a unique word. The unique word may be a word known to be in the received signal A'. For example, when the received signal A' includes a BPSK or QPSK modulated signal, the unique word may be in the preamble of a TDMA burst including the received signal A'.

Detecting a burst at S523 from the output of the correlating step S522 includes determining if at least one of the correlator output values associated with at least one of the correlation-input frequency-shifted versions of the signal of interest A exceeds a predetermined threshold for declaring a burst. When all the correlator output values associated with all the correlation-input frequency-shifted versions of the signal of interest A do not exceed the predetermined threshold, a burst is not detected at S523, and steps S521, S522, and S523 are repeated with the same shift amounts.

When a burst is detected at S523, the selecting step S524 selects and outputs one of the frequency shifted versions of the signal of interest A that is output at the shifting step S521 as the coarse frequency-shifted version of the signal of interest B.

The selecting at S524 is based on the highest correlator output value or peak correlation value (referred to as correlation output) associated with each correlation-input frequency-shifted versions of the signal of interest A resulting from the correlating at S522. When the second highest correlation output value, or the second highest among the peak correlation values associated with each correlation-input frequency-shifted versions of the signal of interest A, exceeds a predetermined percentage of the highest correlation output value, or the highest among the peak correlation values associated with each correlation-input frequency-shifted versions of the signal of interest A (i.e. when the second highest correlation output value is close to the highest correlation output value), the coarse frequency shifted version of the signal of interest B is selected to be a frequency shifted version of the signal of interest A that was not correlated. That is, the selecting step S524 selects a frequency shifted version of the signal of interest A that is between two other frequency-shifted versions of the signal of interest A that were correlation-input frequency-shifted versions of the signal of interest A that were correlated in the correlating step S522 and that resulted in the highest and second highest correlation output values.

When the second highest correlation output value does not exceed a predetermined percentage of the highest correlation output value (i.e. when the second highest correlation output value is not close to the highest correlation output value), the selecting step S524 selects the coarse frequency shifted version of the signal of interest B is selected to be the frequency shifted version of the signal of interest A that resulted in the highest correlation value at the output of the correlating step S522.

The output of selecting the coarse frequency-shifted version of the signal of interest B at S524 is input to a step of generating a fine frequency-shifted version of the signal of interest C at step S525. Different embodiments of generating the fine frequency-shifted version of the signal of interest C are discussed below.

FIG. 6 is a flow diagram of a PSD-based method of generating a fine frequency estimate S525' in a receiver of a communication system according to an embodiment of the present invention. FIG. 6 is a flow diagram of an embodiment of the step S525.

At step S540, the peak correlation value produced by the correlating step at S522, or, in the case of shifting by a plurality of different amounts of frequency shifts at S521, the highest correlation output value produced by the correlating step at S522, is used to estimate and correct a timing error and output a timing error corrected coarse-frequency-shifted version of the signal of interest B. Correcting the timing error at S540 includes estimating the timing error by calculating the sampling phase of the interpolated highest correlation value output at the correlating step S522 and filtering with adjustable interpolation phase.

Following the step of correcting timing error at step S540, estimating phase at step S5255 includes calculating the phase difference between the peak correlation value or highest correlation output value resulting from the correlating step S522 and the nominal constellation position of the preamble.

The output of the step of correcting timing error S540 is also an input to a step of removing modulation at S5251. Step S5251 includes removing the modulation used in transmitting the received signal. For M-PSK modulations (M=2, 4, and 8, for example), a power of M is performed on the signal that is output from the correcting timing error step S540, to remove modulation. The M-th power process substantially increases phase noise power for M=8 or higher in the carrier-to-noise ratio (C/N) range of interest. For example, for 8PSK, the noise power will be increased by 9 dB. Thus, the steps outlined at FIG. 6 may be advantageous for BPSK and QPSK modulated received signals.

At step S5252, the modulation-removed timing error-corrected coarse frequency-shifted version of the signal of interest is auto-correlated to produce an auto-correlated signal.

At S5253, the auto-correlated signal received from the auto-correlating step S5252 is used to produce a PSD, and searching the spectral peak produces a frequency, as the location of the spectral peak. The frequency of the spectral peak is a frequency estimate used to further correct the estimation of the carrier frequency from the frequency of the coarse frequency-shifted version of the signal of interest B.

Searching the spectral peak at S5253 includes performing an FFT on the modulation-removed auto-correlated signal output from step S5252. In estimating frequency by the peak searching method, frequency errors may not be extracted by averaging auto-correlation samples. Instead, frequency errors may be retrieved in the frequency domain by locating the spectral peak of the power spectral density (PSD) function. Estimation of the carrier frequency by this method is dominated by the FFT frequency estimation, which is a maximum likelihood estimation.

The result of searching the spectral peak at S5253 is a fine frequency estimation of the carrier frequency that has a standard deviation comparable to or larger than the FFT frequency resolution. On the other hand, estimating carrier frequency by the L&R method is limited to half of the FFT frequency resolution. Thus, the spectral peak location can be used directly as a final estimate of the carrier frequency. Optionally, the result of estimating frequency with the L&R method can be added to the result of the spectral peak location output as the frequency estimate from step S5253.

Correcting error at S5256 includes using the phase estimation output at S5255 and frequency estimation resulting from searching spectral peak at S5253 and, optionally, frequency estimation resulting from the L&R method, to output the fine frequency-shifted version of the signal of interest C.

The PSD-based method S525', described above, for estimating carrier frequency is a NDA method that increases throughput by eliminating overhead symbols for frequency estimation. By way of comparison, when OL is identified as the observation length and M is identified as the modulation index, the L&R method alone has a frequency tolerance range of 1/(OL*M). When OL is 512 symbols for QPSK and M is 4, the tolerance range is 0.000488. The above-described PSD-based method S525', on the other hand, allows frequency error as large as Rs/2M (where Rs is the symbol rate). Thus, frequency error tolerance is 25% for BPSK and 12.5% for QPSK by the PSD-based method S525'. Further, frequency error tolerance range is decoupled from observation length, which affects C/N, such that low C/N threshold and wide frequency error tolerance range can be achieved independently. That is, the optimization of one of the frequency error tolerance range or the C/N does not adversely affect the other.

Figure 7:
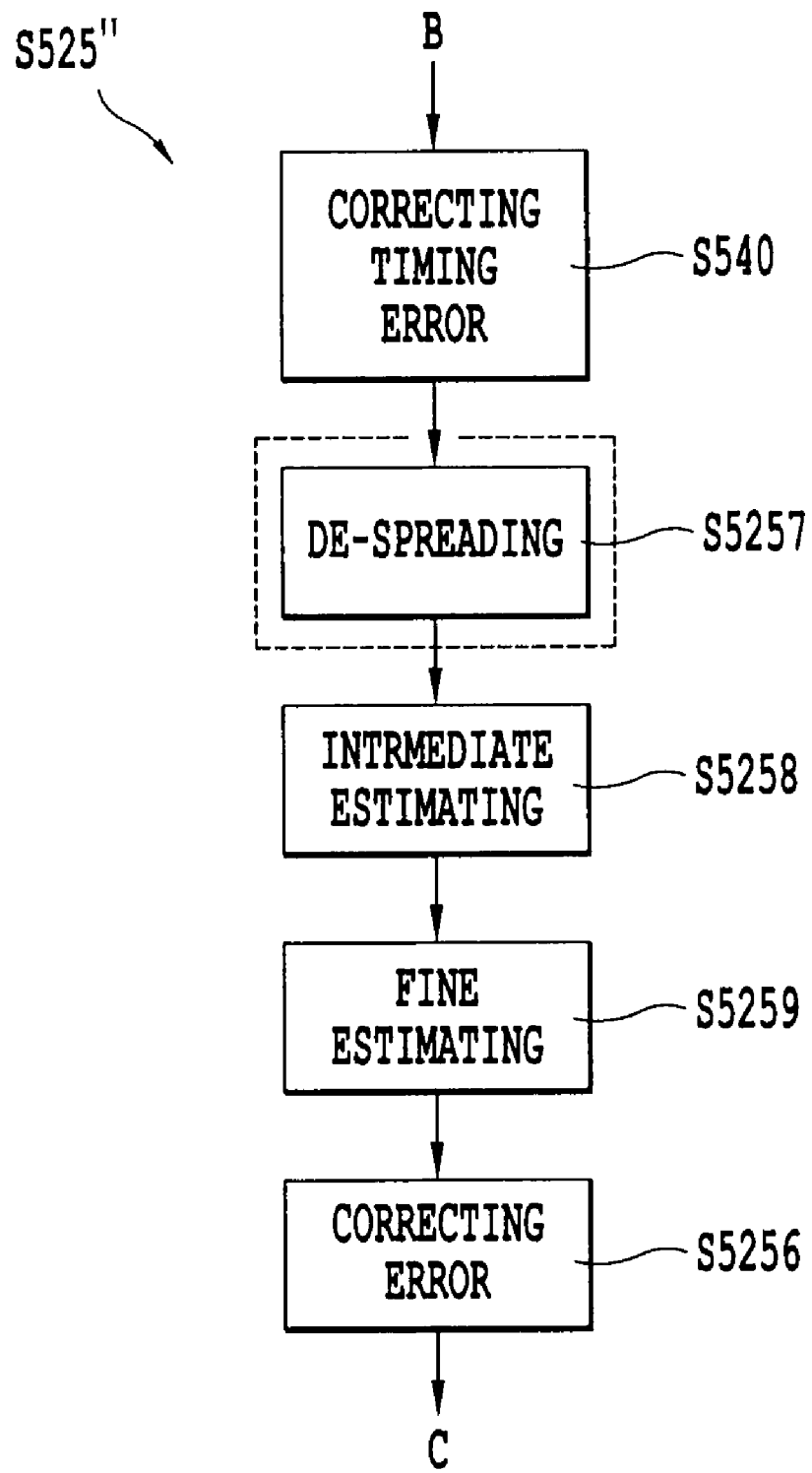
FIG. 7 is a flow diagram of a FEPE-based method of generating a fine frequency estimate in a receiver of a communication system according to an embodiment of the present invention.

FIG. 7 a flow diagram of a FEPE-based method of generating a fine frequency estimate S525" in a receiver of a communication system according to an embodiment of the present invention. FIG. 7 is a flow diagram of another embodiment of the step depicted as S525.

At step S5257, an optional de-spreading step, used in spread spectrum communication systems, is performed on the timing error corrected signal output at step S540. De-spreading S5257 recovers transmitted symbols from received chips in the timing-error corrected signal B based on a spreading factor. The de-spread signal output from the de-spreading step S5257 is input to both the intermediate estimating step S5258 and fine estimating step S5259.

Estimating intermediate frequency at S5258 includes an NDA frequency estimation method acting on the output of the de-spreading step S5257. The NDA frequency estimation method includes implementing a maximum likelihood estimation and selecting, as the intermediate frequency estimation of the carrier frequency, the location of the spectral peak of the signal output from de-spreading at S5257.

In a non-limiting embodiment of the NDA frequency estimation method, 800 symbols, which are the first 800 BPSK symbols output from the de-spreading step S5257, are modulation-removed and decimated by a factor of 32 to reduce sampling frequency to 3.125% of the symbol rate. The decimating allows a small FFT to be used to achieve a desired intermediate frequency resolution. The signal spectrum is obtained from the FFT, and the location in frequency of the spectral peak is output as an intermediate estimate of the carrier frequency.

At S5259, fine estimating of carrier frequency can be implemented as a frequency estimation through phase estimation method. The phase estimating is based on the signal output from the de-spreading step S5257. The result of the intermediate estimating at S5258 is used to unwrap the phase estimates by subtracting the phase shift amount caused by the intermediate frequency estimation from the phase trajectory of the phase estimates. Based on the unwrapped phase estimates and the frequency estimation through phase estimation method, a fine frequency estimate of the carrier frequency is output from the fine estimating step S5259.

At S5256, the result of fine estimating of frequency at S5259 is used to correct an error in carrier frequency estimation included in the coarse frequency-shifted version of the signal of interest B to output the fine frequency-shifted version of the signal of interest C.

FIGS. 8(a) and 8(b) are block diagrams of a matched filter 100 according to an embodiment of the present invention. FIG. 8(a) shows a pipelined structure with a same processing latency as a conventional transversal finite impulse response (FIR) structure. As shown for the processing element in FIG. 8(b), truncation is not performed till the end of the structure. To provide higher signal dynamic range at low signal-to-noise ratio (SNR), 12-bit word length may be used for the input while the output of the filter has 10 bits.

FIGS. 9(a) and 9(b) are block diagrams of a timing error corrector 1121 implemented as a piecewise parabolic interpolator with a Farrow structure according to an embodiment of the present invention. The Farrow structure, depicted at FIG. 9(a) can adjust signal timing phase by a fraction of the sample period. When the fraction corresponds to a fractional part of the timing error μ, which can be estimated using the structure depicted at FIG. 9(b), based on the peak correlator 111 output or output from the processor 1112 of the multi-correlator 111', fine timing adjustment is achieved. The resolution of the timing error correction is based on the number of bits used to quantize the timing error $\mu (0 \leq \mu \leq 1)$ values. FIG. 9(a) depicts a non-limiting example using 6 bits (unsigned) for μ.

FIG. 10 is a block diagram of a modulation removal unit 1122 according to an embodiment of the present invention. The modulation removal unit 1122 can be implemented with CORDIC rectangular-to-polar and polar-to-rectangular converters. For 10-bit phase resolution, 9 CORDIC stages are needed for each conversion direction. Modulation is removed by multiplying the phase output of the rectangular-to-polar CORDIC by M, which is 2 for BPSK and 4 for QPSK.

FIG. 11 is a block diagram of an auto-correlator 1123, according to an embodiment of the present invention, with an observation length N=512, and correlation lag, cl, such that $1 \leq cl \leq 256$. Only the first half of the autocorrelation values are used for estimation for best performance of the L&R estimation. With a maximum symbol rate of 7.5 Msym and a maximum clock frequency of 120 MHz, the auto-correlator can be implemented with 16 complex multipliers and 16 Integrate & Dump, which are time-shared 16 times.

FIG. 12 is a block diagram of a DFT structure, using a Chebyshev polynomial approximation, that could be used in a spectral peak search unit 1124 according to an embodiment of the present invention. The depicted implementation structure of the DFT generates one complex coefficient and performs one complex multiplication in each clock cycle. Thirty two (32) clock cycles are needed to compute one frequency bin of a 32-point DFT. Because the complex DFT coefficients are generated recursively, only a small sin/cos lookup table (LUT) is needed.

Two look-up tables (LUT) are needed by the DFT structure of FIG. 12. One is a Frequency LUT which stores normalized frequencies of an initial 32-point DFT, as well as some discrete frequencies of a bigger DFT (e.g. 1024-point DFT), needed for coarse peak location and frequency steps of the recursive DFT. The other LUT, shown in FIG. 12, is for sin/cos coefficients of a 1024-point DFT. It stores values of sin(2*pi*k/1024) and cos(2*pi*k/1024), for k=0, 1, . . . , 1023. The table size can be reduced by a factor of 4 with a quarter-range [0, π/2] rather than a full-range [0, 2π] LUT.

As depicted at FIG. 10, after the auto-correlator, a decimation half-band filter (HBF) chain with a decimation factor (K, where K is an integer power of 2. For example, K=16 at FIG. 10) is used such that the spectral analysis range is reduced by a factor of K, or equivalently, the frequency error is scaled up by the decimation factor (K). In addition, the frequency error is also magnified by a factor of Mm due to modulation removal, where M=1 for BPSK and 2 for QPSK. Using the HBF decimation filter can be advantageous because a K-time reduction of DFT size can be achieved as compared to a scheme where the auto-correlator output, for example, signal LL shown at FIG. 3, is not decimated. The final frequency estimate is the sum of the spectral peak location and the fine frequency estimate obtained using the L&R method, scaled back by K*M. The fine frequency estimate obtained with the L&R method need not be summed if the DFT size is chosen sufficiently large.

The spectral peak search may be based on a binary searching algorithm. The basic assumptions that allow the use of the algorithm are that: (a) the true spectral peak location is close to the initial peak location obtained from the global peak search of the 32 frequency bins of the 32-point DFT, and (b) the error of the peak location is within +/−df/2, where df is the frequency resolution, which is the distance between two adjacent frequency bins.

FIG. 13 is a block diagram of a de-spreader according to an embodiment of the present invention. The de-spreading of a direct sequence spread spectrum system is achieved through partial correlations of the code-aligned received chips in the timing error corrected coarse frequency-shifted version of the signal of interest B with the spreading code. The length of the partial correlations (in number of chips) is equal to the spreading factor (SF). The incoming chip signal is aligned with the de-spreading PN sequence which is a local copy of the spreading PN sequence and is read from the memory of a storage medium. The de-spreader is a "Integrate & Dump" operating at the chip rate. The integrator dumps its contents and then resets every spreading factor (SF) chip clocks. The spreading gain is achieved through Integrate & Dump of the partial correlation process.

FIG. 14 is a block diagram of an intermediate estimator 1129 according to an embodiment of the present invention.

An NDA frequency estimator can be used for the intermediate frequency estimator 1129. In a non-limiting embodiment, input to the estimator is the first 800 BPSK symbols of the de-spreader 1128 output. It thus consists of two midambles and most part of the payload. The square operation is to remove the BPSK modulation at the de-spreader output. A total of 800 symbols are used for NDA estimation. A simple Integrate & Dump is used to decimate the modulation-removed signal by a factor of 32 so that the sampling frequency is reduced to 3.125% of the symbol rate. The decimation filter allows the use of a small FFT to achieve the desired frequency resolution for the intermediate frequency estimator.

In noise-free conditions, a 3-amble frequency estimator can theoretically tolerate frequency errors in the range of +/−1/(2AD), where AD is the distance between adjacent ambles. Frequency errors outside this range will cause the phase trajectory over the 2AD-symbol interval wrapping-around leading to a wrong frequency estimate. In practice, particularly at low C/N, the tolerance range may need to be lower than the theoretical value to avoid phase ambiguity. Simulation shows that the maximum frequency error should not be more than 80% of the theoretical limit. Therefore, a maximum frequency error that may be tolerated by the 3-amble frequency estimator may be 0.8/(2AD), or 0.1% Rs for AD=400 symbols.

A straightforward method of NDA frequency estimation of this kind is a maximum likelihood estimator that uses a spectral analyzer (FFT) to analyze the sampled bandwidth which equals the symbol rate and then picks the location where spectral peak occurs as the frequency estimate. To resolve a frequency resolution of 0.8/(2M), the FFT size (Nfft) must be at least 2M/0.8=2.5M=1000, i.e., $$\frac{0.8}{2AD} > \frac{1}{N_{\mathit{fft}}} \qquad (1)$$

or, $$N_{\mathit{fft}} > 2.5AD$$

So, Nfft=1024 is selected for AD=400.

The complexity of the NDA frequency estimator can be reduced by decimating the input signal prior to spectral analysis. This is allowed because the range of the frequency error is known. A smaller FFT (i.e. instead of a 1024-point FFT) can be used as a result of the decimation. How much smaller the FFT can be depends on the maximum frequency error (seen by the NDA estimator) and the characteristics of the decimation filter. The maximum frequency error determines the maximum decimation factor assuming that the decimation filter has 'brick-wall' (ideal) lowpass characteristics. The relationship between the decimation factor (D) and the maximum frequency error that the demodulator can tolerate is $$\frac{0.5}{D} \geq \frac{2 \cdot df T_{max}}{N_{corr}} \qquad (2)$$

where dfTmax is the maximum frequency error in symbol rate and Ncorr is the number of correlators for coarse frequency estimate and pre-correction. For dfTmax=0.015625 and Ncorr=4, D≦64, or, Dmax=64.

The decimation factor may be less than this theoretical maximum (Dmax) due to non-ideal lowpass characteristics of a practical decimation filter.

A simple Integrate & Dump may advantageously minimize the complexity of the decimation filter. Since the frequency characteristics of an Integrate & Dump filter is a sinc function which has significant roll-off in the main lobe whose width is 2/D, a large D can not be used. Simulation results suggest that D=32 can be used to achieve reliable NDA frequency estimation when AD=400.

Consequently, the FFT size can be reduced by a factor of D (=32). A 32-to-1 Integrate & Dump and a 32-point FFT can be used to achieve the same frequency resolution of a 1024-point FFT.

Figure 16:
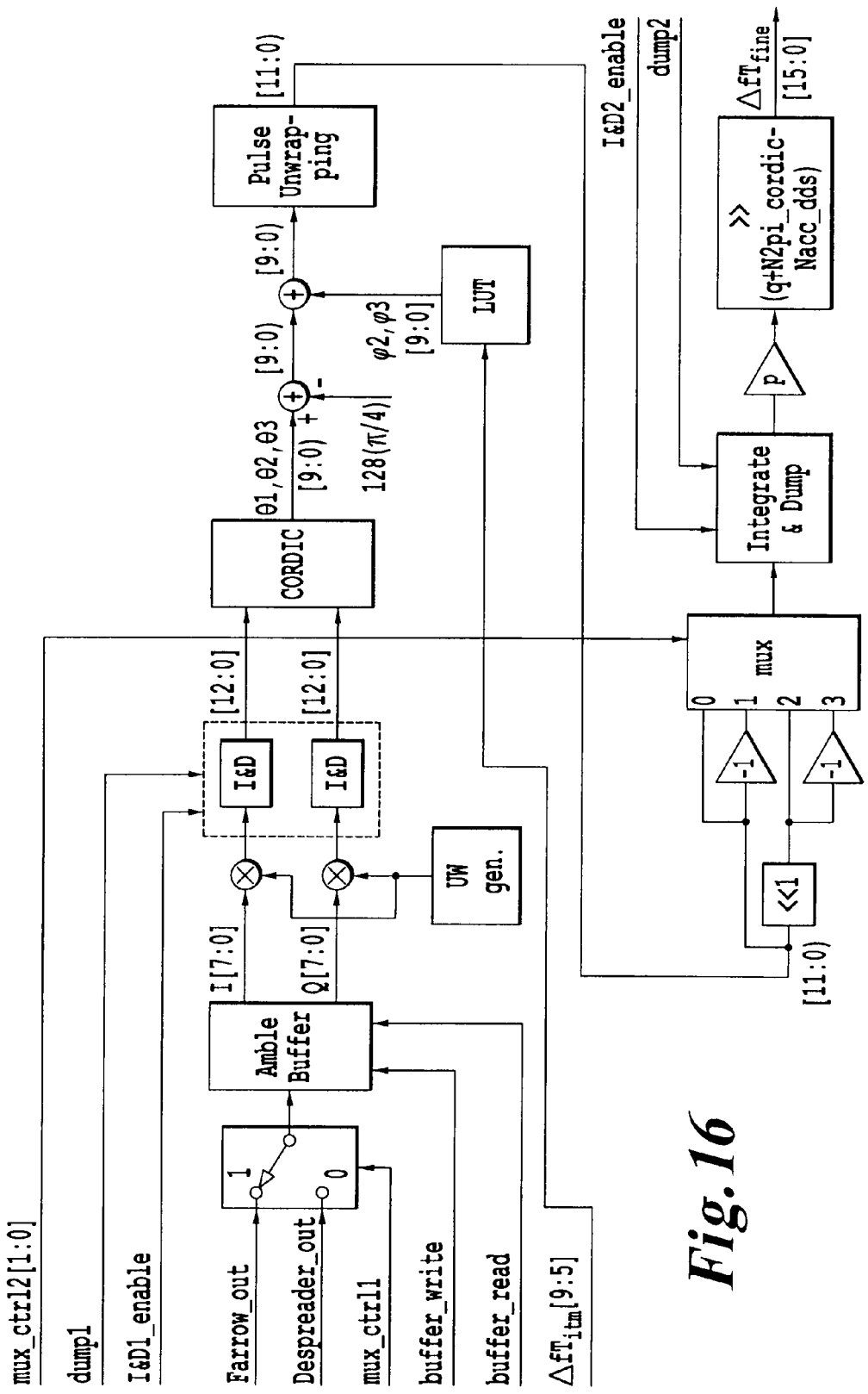
FIG. 16 is a block diagram of a serial implementation of a fine frequency estimator according to an embodiment of the present invention.

FIGS. 15 and 16 include block diagrams of fine frequency estimators according to two embodiments of the present invention.

The frequency estimation is based on a FEPE (Frequency Estimation through Phase Estimation) approach.

Three phase estimates, at the centers of the three ambles, may be used for frequency error estimation in this feed-forward carrier recovery scheme. These phase estimates are obtained by calculating the phases of correlation peaks at amble positions. Although the phase estimate (θ1) at the center of the preamble can be calculated in a unique word (UW) detection module where the correlation peak is readily available, phase estimate at this point may not be accurate as the true correlation peak is μ*Tsamp away from this peak position. Thus, the correlation peak may be recalculated after the timing error corrector 1121, implemented as a Farrow interpolator, which corrects the fractional timing error μ. The phase estimate θ1 is thus the phase of the new correlation peak. Since midamble UWs are spread along with the information bits, midamble correlations with UW1 and UW2 are performed after the de-spreading at the symbol level, when de-spreading is done.

Assuming that the received signal experiences linear phase changes (i.e., a constant frequency offset) over the burst interval, the phase of UW correlation peak represents the average phase of the amble, which is the signal phase at the center of the amble. Therefore, phase estimates θ1, θ2, and θ3 correspond to signal constellation rotations at the centers of the preamble, midamble 1, and midamble 2, respectively.

Figure 17:
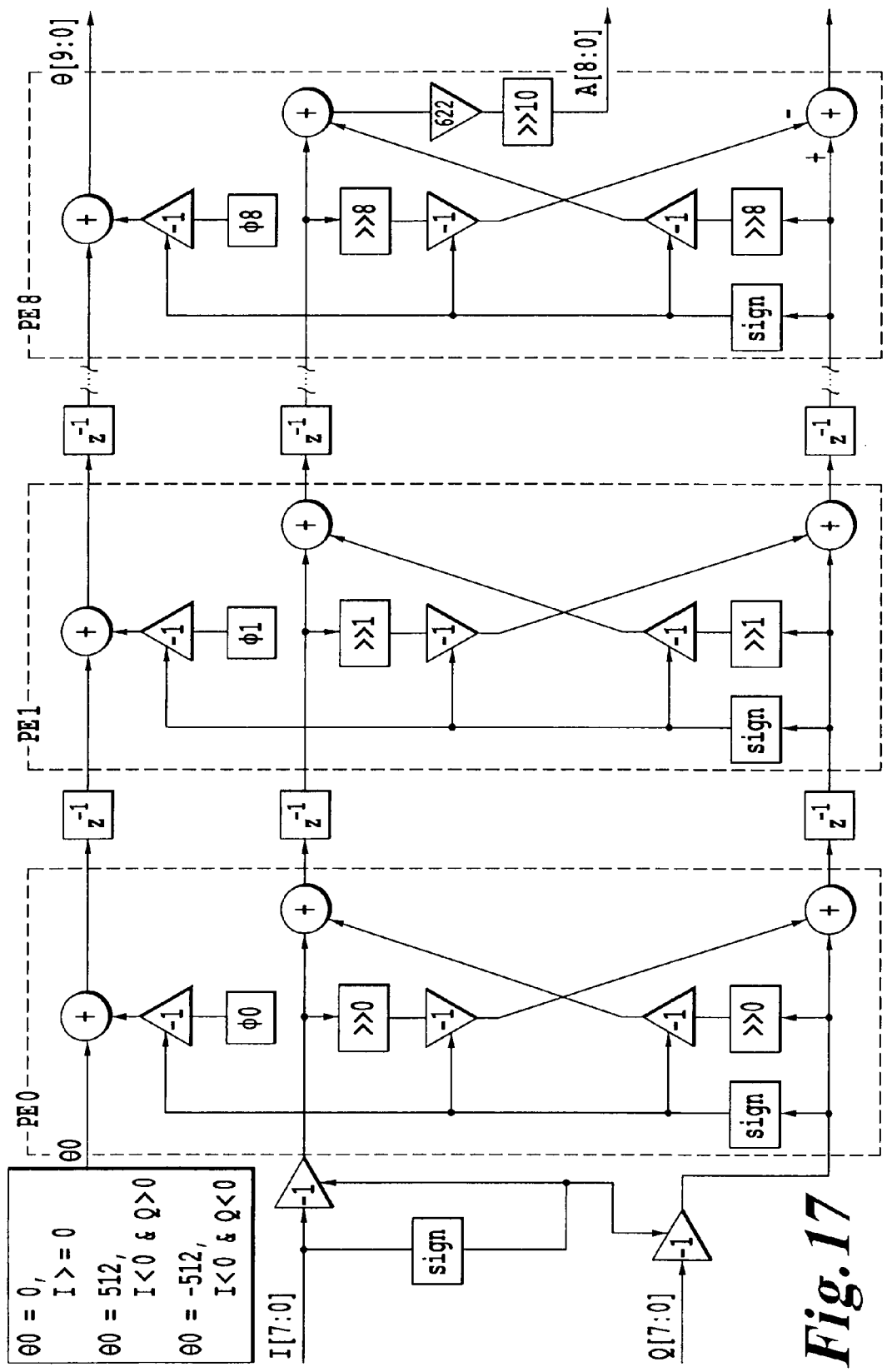
FIG. 17 is a block diagram of a phase estimator according to an embodiment of the present invention.

FIG. 17 is a block diagram of a phase estimator according to an embodiment of the present invention. To calculate the phases of correlation peaks, a CORDIC-based rectangular-to-polar converter can be used. A 9-stage CORDIC pipeline structure with 10-bit phase resolution is shown at FIG. 17. Since only the phase output is needed, the final scalar (622) of the magnitude out is not necessary. To minimize the hardware, this pipeline structure can be easily converted into a recursive structure in which only one CORDIC PE is used. Further, the recursive CORDIC can be reused to calculate all three phase estimates because they are calculated only once for every burst.

The FEPE frequency estimation formula can be derived as $$\Delta fT = \frac{0.2}{AD}(-3 \cdot \theta 1 + \theta 2 + 2 \cdot \theta 3) \qquad (1)$$

where ΔfT is the normalized (by symbol rate) frequency error and θ1, θ2, and θ3 are phase estimates all normalized by 2π.

It should be noted that the phase estimates in above equation may need to be phase unwrapped if |θ2-θ1| or |θ3-θ2| exceed 180 degrees. As discussed, the intermediate estimator 1129 is used to achieve phase unwrapping.

An example of a direct implementation scheme of the frequency estimator is shown in FIG. 15. A trivial shift-and-add is used to implement 3*θ1 in Eq. (1). The parameter 'N2pi_cordic' is the number of bits to quantize the 2π angle in the CORDIC structure used for rectangular-to-polar conversion in the phase estimation. Similarly, 'Nacc_dds' is the number of bits of DDS accumulator, which determines the quantization resolution of the frequency error. For example, N2pi_cordic=10 and Nacc_dds=16.

The purpose of subtraction by π/4 (128 in integer) at CORDIC output is to rotate the 45-degree BPSK constellation to a horizontal one.

Alternatively and potentially more efficiently, as shown in FIG. 16, the frequency estimator can be implemented in a serial manner by sharing a common correlation peak calculation block and a common CORDIC processor. The summation of phase estimates in Eq. (1) is done through an Integrate & Dump. To accumulate -3*θ1, θ1 sample is repeated twice. The four quantities to be accumulated are -1*θ1, -2*θ1, θ2, and 2*θ3. A mux is used to select the four sequentially. The control signal of the mux ('mux_ctr12') has 2 bits. For each estimate, 'mux_ctr12' must repeat the sequence of {1, 3, 0, 2} (or equivalently {3, 1, 0, 2}).

The Amble Buffer stores the preamble at 1 sample per chip from the output of the timing error corrector 1121, or Farrow output, and the two midambles at 1 sample per symbol from the de-spreader output. The amble samples are read from the buffer at the chip clock ('ce_chip'). The UW correlation peak generator uses two Integrate & Dump blocks that dump the correlation peak at the end of the UW.

Figure 18:
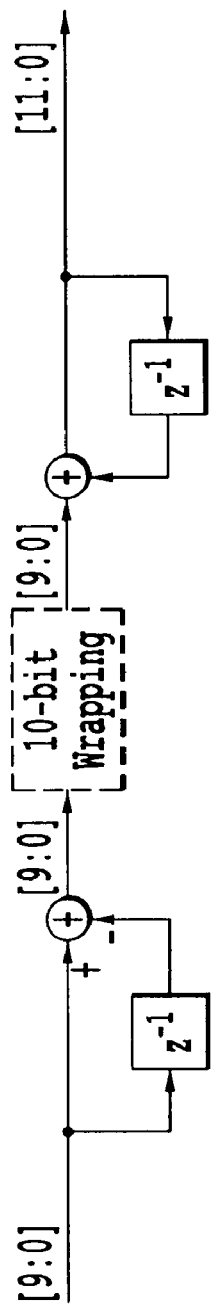
FIG. 18 is a block diagram of a phase unwrapping circuit according to an embodiment of the present invention.

FIG. 18 is a block diagram of a phase unwrapping circuit according to an embodiment of the present invention. The phase de-wrapper of FIG. 18 is for de-wrapping of phases when there is no 2π phase ambiguity between any pair of adjacent phase values (i.e. a nominal case). For example, phase values 100, −160, and −60 degrees will be de-wrapped to 100, 200, and 300 degrees, respectively, with the de-wrapper shown in FIG. 18. When there is a large frequency error that causes an adjacent phase span larger than 2π, there will be phase ambiguity that prevents the structure shown at FIG. 18 from properly de-wrapping the phase. For example, if the true phase step between adjacent phases is 600 degrees and the first phase value is 100 degrees, the three wrapped phases will be 100, −20, and −140 degrees. The phase de-wrapper of FIG. 18 will output 100, −20, and −140 degrees instead of 100, 700, and 1300 degrees. As discussed below with regard to FIG. 19 and the use of the intermediate frequency estimate to resolve phase ambiguity, the phase ambiguity can be resolved if a sufficiently large part of the frequency error is known.

The phase unwrapping circuit shown in FIG. 18 consists of a subtractor and an accumulator. The '10-bit wrapping' block is conceptual and there is no logic in it. In fixed-point arithmetic, it is simply the natural wrapping-around of a signed 2's complement number. Therefore, subtractor input and output may need to have the same bit-width, and no saturation may be allowed.

Because there are three phase terms that involve the unwrapping process, a worst-case scenario (in terms of bit-width requirement) may make the maximum value of the unwrapped output close to 3 times the full-range value of the input. Consequently, two extra bits may be used to represent the unwrapped phase output.

Frequency error seen by the NDA intermediate estimator and the 3-amble frequency estimators can be as high as +/−0.390625%. This error may not be compensated until the fine frequency estimate is obtained. Thus, the 3-amble frequency estimator, which is an FEPE estimator, cannot tolerate the error because of phase wrapping of the phase trajectory. The intermediate estimate obtained with the NDA intermediate estimator is used to resolve the phase ambiguity in a process of de-wrapping.

Figure 19:
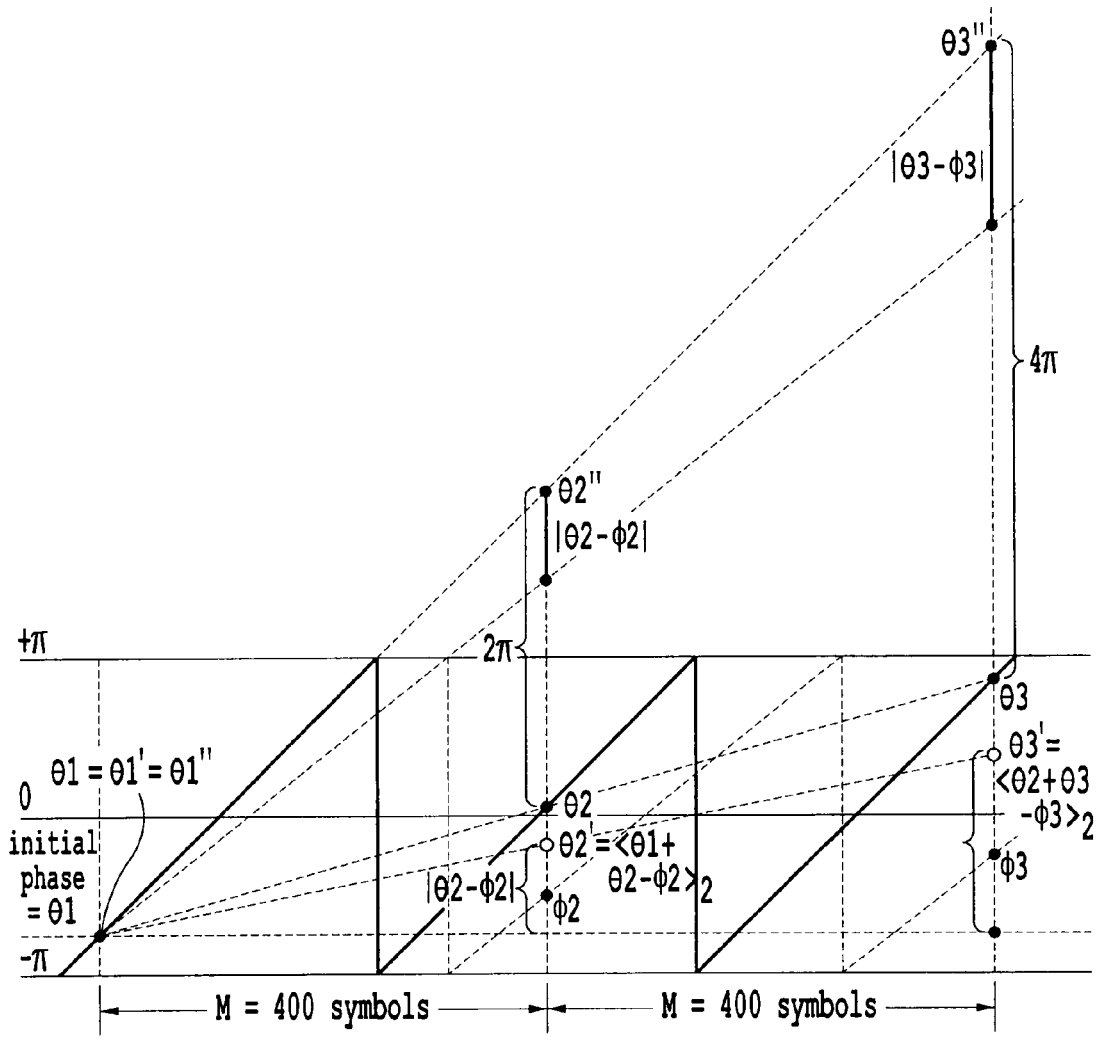
FIG. 19 shows the process of de-wrapping phase trajectories.

As shown in FIG. 19, the phase de-wrapping of the phase fold-over due to intermediate frequency error amount is done by subtracting the phase shift amount caused by the intermediate frequency estimate from the phase trajectory. Once the wrapping of the phase trajectory is removed in this manner, the fine frequency estimate is within the tolerance range of the fine frequency estimator.

FIG. 19 shows the process of de-wrapping phase trajectories. The phase angles θ1, θ2, and θ3 are the estimates of the phase drift due to the residual frequency error (=ΔfT−ΔfT-coarse) at centers of the three ambles. Because the residual frequency error is likely outside the frequency tolerance range of the 3-amble estimator, the phase difference between adjacent phase estimates can be larger than 360 degrees causing phase ambiguity of the phase trajectory of the wrapped phases θ1-θ2-θ3, which is different from the true phase trajectory θ1"-θ2"-θ3". If the intermediate frequency estimate (ΔfTitm) is available, the three phases of the wrapped phase trajectory Φ1, Φ2, and Φ3 are given by $$\begin{cases} \phi 1 = \theta 1 \\ \phi 2 = \langle \theta 1 + 2\pi \cdot \Delta fT_{itm} \cdot AD \rangle_{2\pi} \\ \phi 2 = \langle \theta 1 + 4\pi \cdot \Delta fT_{itm} \cdot AD \rangle_{2\pi}, \end{cases} \quad (1)$$

where $\langle \ \rangle_{2\pi}$ is the modulo-by-2π operator.
The fine frequency estimate is given by $$\Delta fT_{fine} = \frac{0.2}{AD}(-3 \cdot \theta 1' + \theta 2' + 2 \cdot \theta 3'), \quad (2)$$

where $$\begin{cases} \theta 1' = \theta 1 \\ \theta 2' = \langle \theta 1 + \theta 2 - \phi 2 \rangle_{2\pi} = \langle \theta 2 - 2\pi \cdot \Delta fT_{itm} \cdot AD \rangle_{2\pi} = \langle \theta 2 + \varphi 2 \rangle_{2\pi} \\ \theta 3' = \langle \theta 1 + \theta 3 - \phi 3 \rangle_{2\pi} = \langle \theta 3 - 4\pi \cdot \Delta fT_{itm} \cdot AD \rangle_{2\pi} = \langle \theta 3 + \varphi 3 \rangle_{2\pi} \end{cases} \quad (3)$$

and the correction terms Φ2 and Φ3 are $$\begin{cases} \varphi 2 = \langle -2\pi \cdot \Delta fT_{itm} \cdot AD \rangle_{2\pi} \\ \varphi 3 = \langle -4\pi \cdot \Delta fT_{itm} \cdot AD \rangle_{2\pi} \end{cases} \quad (4)$$

The phase trajectory θ1'-θ2'-θ3' defines the correct fine frequency estimate. The final frequency estimate for the frequency errors seen by the intermediate and fine frequency estimator is the sum of the two estimates, i.e., $$\Delta fT' = \Delta fT_{itm} + \Delta fT_{fine} \quad (5)$$

ΔfT' is also the amount used for frequency correction because the amount of the coarse frequency estimate has been compensated by the multi-correlator 111'.

The overall estimated frequency error to be reported is the sum of the three estimates, $$\Delta fT' = \Delta fT_{coarse} + \Delta fT_{itm} + \Delta fT_{fine} \quad (6)$$

Because there are 32 distinct values for ΔfTitm, the correction terms Φ2 and Φ3 in Eq. (3) can be read from a look-up table.

Once the estimated phases are corrected with Φ2 and Φ3, the fine frequency estimate is calculated according to Eq. (2).

One or more processors, executing programs stored in one or more storage media, may be employed as any of the devices discussed above to perform any of the functions discussed above. Exemplary processors/microprocessor and storage medium(s) are listed herein and should be understood by one of ordinary skill in the pertinent art as non-limiting. Microprocessors used to perform the methods of the present invention could utilize a computer readable storage medium, such as a memory (e.g. ROM, EPROM, EEPROM, flash memory, static memory, DRAM, SDRAM, and their equivalents), but, in an alternate embodiment, could further include or exclusively include a logic device for augmenting or fully implementing the present invention. Such a logic device includes, but is not limited to, an application-specific integrated circuit (ASIC), a field programmable gate array (FPGA), a generic-array of logic (GAL), a Central Processing Unit (CPU), and their equivalents. The microprocessors can be separate devices or a single processing mechanism.

Numerous modifications and variations of the present invention are possible in light of the above teachings. It is therefore to be understood that within the scope of the appended claims, the invention may be practiced otherwise than as specifically described herein.

The invention claimed is:

1. A receiver for a communication system, the receiver comprising:
a matched filter configured to extract a signal of interest from a received signal that includes data that is encoded;
a carrier recovery system comprising
a multi-correlator configured to generate frequency-shifted versions of the signal of interest, correlate at least two of the frequency-shifted versions of the signal of interest with a predetermined unique word in a plurality of correlators to produce at least two correlation values, and output a selected one of the frequency-shifted versions of the signal of interest as a coarse frequency-shifted version of the signal of interest based on all of the correlation values, and
a fine frequency estimator configured to frequency shift the coarse frequency-shifted version of the signal of interest to produce a fine frequency-shifted version of the signal of interest; and
a decoder configured to decode the data from the fine frequency-shifted version of the signal of interest.

2. The receiver according to claim 1, wherein a difference between a carrier frequency and a frequency of the signal of interest, which is input to the multi-correlator, is greater than a difference between the carrier frequency and a frequency of the coarse frequency-shifted version of the signal of interest, which is output by the multi-correlator and input to the fine frequency estimator.

3. The receiver according to claim 1, wherein the multi-correlator comprises:
a plurality of parallel shifters, each shifter configured to generate a different one of the frequency-shifted versions of the signal of interest according to a different shift amount;
a shift setting device configured to set the different shift amount corresponding to each of the frequency-shifted versions of the signal of interest as a multiple of a frequency delta $\Delta f$ corresponding to a maximum frequency capture range and a number of the correlators, according to the following equation $\Delta f$=(maximum tolerable frequency error of a demodulator of the receiver)/(the number of the correlators);

a correlation selector configured to select a highest correlation value and a second highest correlation value from the at least two correlation values;
a signal selector configured to output one of the frequency-shifted versions of the signal of interest; and
a threshold unit configured to compare the highest correlation value to the second highest correlation value, select a selected shift amount based on a result of the comparison, and instruct the signal selector to output, as the coarse frequency-shifted version of the signal of interest, a frequency-shifted version of the signal of interest that is shifted by the selected shift amount.

4. The receiver according to claim 3, wherein
a number of the shifters is greater than a number of the correlators,
the shifters generate the frequency-shifted versions of the signal of interest in pairs, one signal of each pair having a frequency increased by a pair shift amount and an other signal of each pair having a frequency decreased by the pair shift amount, from a frequency of the signal of interest,
pairs of frequency-shifted versions of the signal of interest are input to the correlators, a number of pairs of frequency-shifted versions of the signal of interest input to the correlators being less than a total number of pairs of frequency-shifted versions of the signal of interest generated by the shifters,
when the second highest correlation value exceeds a predetermined percentage of the highest correlation value, the threshold unit selects a shift amount of a frequency-shifted version of the signal of interest that was not input to a correlator, and
when the second highest correlation value does not exceed the predetermined percentage of the highest correlation value, the threshold unit selects a shift amount corresponding with a frequency-shifted version of the signal of interest that was input to a correlator and resulted in the highest correlation value.

5. The receiver according to claim 3, wherein
a number of the shifters is greater than a number of the correlators,
the shifters generate the frequency-shifted versions of the signal of interest in pairs, one signal of each pair having a frequency increased by a pair shift amount and an other signal of each pair having a frequency decreased by the pair shift amount, from a frequency of the signal of interest,
pairs of frequency-shifted versions of the signal of interest are input to the correlators, a number of pairs of frequency-shifted versions of the signal of interest input to the correlators being less than a total number of pairs of frequency-shifted versions of the signal of interest generated by the shifters,
when the second highest correlation value exceeds a predetermined percentage of the highest correlation value, the threshold unit instructs the signal selector to output a frequency-shifted version of the signal of interest that is shifted by the multiple of the frequency delta $\Delta f$ from a frequency shift corresponding to the highest correlation value, and
when the second highest correlation value does not exceed the predetermined percentage of the highest correlation value, the threshold unit instructs the signal selector to output a frequency-shifted version of the signal of interest corresponding to the highest correlation value.

6. The receiver according to claim 3, wherein:
Mshft shifters generate Mshft frequency-shifted versions of the signal of interest, where Mshft is an integer value,
Ncorr correlators that correlate Ncorr of the Mshft frequency-shifted versions of the signal of interest, where Ncon is an integer value and Mshft>Ncorr;
the highest correlation value C0 is output by a correlator with an index k, and the second highest correlation value C1 is output by a correlator with an index j;
when C1 is greater than a predetermined percentage of C0, the threshold unit selects a shift amount of ((Ncorr+1)−k−j)*$\Delta f$; and
when C1 is not greater than a predetermined percentage of C0, the threshold unit selects a shift amount of ((Ncorr+1)−2*k)*$\Delta f$.

7. The receiver according to claim 2, wherein the fine frequency estimator comprises:

a spectral peak search unit configured to locate a spectral peak of the coarse frequency-shifted version of the signal of interest, and output a frequency corresponding to the spectral peak; and an error corrector configured to correct the difference between the carrier frequency and the frequency of the coarse frequency-shifted version of the signal of interest based on the frequency output by the spectral peak search unit, and output the fine frequency-shifted version of the signal of interest, wherein a difference between the carrier frequency and a frequency of the fine frequency-shifted version of the signal of interest is less than the difference between the carrier frequency and the frequency of the coarse frequency-shifted version of the signal of interest.

8. The receiver according to claim 2, wherein the fine frequency estimator comprises:

an intermediate frequency estimator configured to output an intermediate frequency estimate, wherein a difference between the carrier frequency and the intermediate frequency estimate is less than the difference between the carrier frequency and the frequency of the coarse frequency-shifted version of the signal of interest;

a plurality of phase estimators configured to correlate the coarse frequency-shifted version of the signal of interest with a plurality of unique words over a predetermined correlation period, generate a plurality of correlation values corresponding with each of the plurality of unique words, and generate a plurality of phase estimates based on a plurality of peak correlation values, each peak correlation value corresponding with one of the plurality of unique words;

a fine frequency estimator configured to generate a fine frequency estimate of the carrier frequency based on the intermediate frequency estimate and the plurality of phase estimates using a frequency estimate through phase estimate technique; and an error corrector configured to correct a frequency error in the coarse frequency-shifted version of the signal of interest based on the fine frequency estimate and generate the fine frequency-shifted version of the signal of interest, wherein a difference between the carrier frequency and a frequency of the fine frequency-shifted version of the signal of interest is less than the difference between the carrier frequency and the frequency of the coarse frequency-shifted version of the signal of interest.

9. The receiver according to claim 8, wherein the intermediate frequency estimator generates the intermediate frequency based on a frequency of a spectral peak of the coarse frequency-shifted version of the signal of interest.

10. The receiver according to claim 8, wherein the fine frequency estimator is further configured to resolve phase ambiguity of the plurality of phase estimates based on the intermediate frequency estimate.

11. A method of decoding data from a received signal in a receiver of a communication system, the method comprising:

extracting a signal of interest from the received signal;

generating a plurality of frequency-shifted versions of the signal of interest by shifting the signal of interest;

correlating at least two of the frequency-shifted versions of the signal of interest with a predetermined unique word to generate at least two correlation values;

outputting a selected one of the frequency-shifted versions of the signal of interest as a coarse frequency-shifted version of the signal of interest based on all of the correlation values;

frequency shifting the coarse frequency-shifted version of the signal of interest to produce a fine frequency-shifted version of the signal of interest; and decoding the data from the fine frequency-shifted version of the signal of interest.

12. The method according to claim 11, wherein a difference between a carrier frequency and a frequency of the signal of interest is greater than a difference between the carrier frequency and a frequency of the coarse frequency-shifted version of the signal of interest.

13. The method according to claim 11, wherein the generating the frequency-shifted versions of the signal of interest comprises:

generating each of the plurality of the frequency-shifted versions of the signal of interest according to a different shift amount;

setting the different shift amount corresponding to each of the frequency-shifted versions of the signal of interest as a multiple of a frequency delta $\Delta f$ corresponding to a maximum frequency capture range and a number of the correlators, according to the following equation $$\Delta f = \text{(maximum tolerable frequency error of a demodulator of the receiver)/(the number of the correlators)};$$

selecting a highest correlation value and a second highest correlation value from the at least two correlation values;

comparing the highest correlation value to the second highest correlation value;

selecting a selected shift amount based on a result of the comparison; and outputting, as the coarse frequency-shifted version of the signal of interest, a frequency-shifted version of the signal of interest that is shifted by the selected shift amount.

14. The method according to claim 13, wherein the selecting further comprises:

generating the frequency-shifted versions of the signal of interest in pairs, one signal of each pair having a frequency increased by a pair shift amount and an other signal of each pair having a frequency decreased by the pair shift amount, from a frequency of the signal of interest;

correlating pairs of frequency-shifted versions of the signal of interest, a number of pairs of frequency-shifted versions of the signal of interest being correlated is less than a total number of pairs of frequency-shifted versions of the signal of interest generated by the shifting;

when the second highest correlation value exceeds a predetermined percentage of the highest correlation value, selecting a shift amount of a frequency-shifted version of the signal of interest that was not correlated by the correlating; and when the second highest correlation value does not exceed the predetermined percentage of the highest correlation value, selecting a shift amount corresponding with a frequency-shifted version of the signal of interest that resulted in the highest correlation value.

15. The receiver method according to claim 13, further comprising:

generating the frequency-shifted versions of the signal of interest in pairs, one signal of each pair having a frequency increased by a pair shift amount and an other signal of each pair having a frequency decreased by the pair shift amount, from a frequency of the signal of interest;

correlating pairs of frequency-shifted versions of the signal of interest, a number of pairs of frequency-shifted versions of the signal of interest that are correlated is less than a total number of pairs of frequency-shifted versions of the signal of interest generated by the generating;

when the second highest correlation value exceeds a predetermined percentage of the highest correlation value, outputting a frequency-shifted version of the signal of interest that is shifted by the multiple of the frequency delta $\Delta f$ from a frequency shift corresponding to the highest correlation value; and when the second highest correlation value does not exceed the predetermined percentage of the highest correlation value, outputting a frequency-shifted version of the signal of interest corresponding to the highest correlation value.

16. The method according to claim 13, further comprising:
generating Mshft frequency-shifted versions of the signal of interest, where Mshft is an integer value;
correlating Ncorr of the Mshft frequency-shifted versions of the signal of interest, where Ncorr is an integer value and Mshft>Ncorr;
outputting the highest correlation value C0 with an index k<Ncorr;
outputting the second highest correlation value C1 with an index j<Ncorr;
selecting a shift amount of ((Ncorr+1)−k−j)*$\Delta f$ when C1 is greater than a predetermined percentage of C0; and
selecting a shift amount of ((Ncorr+1)−2*k)*$\Delta f$ when C1 is not greater than a predetermined percentage of C0.

17. The method according to claim 12, producing the fine frequency-shifted version of the signal of interest comprises:
locating a spectral peak of a signal based on the coarse frequency-shifted version of the signal of interest, and outputting a spectral peak frequency corresponding to the spectral peak; and
correcting the difference between the carrier frequency and the frequency of the coarse frequency-shifted version of the signal of interest based on the spectral peak frequency, and outputting the fine frequency-shifted version of the signal of interest,
wherein a difference between the carrier frequency and a frequency of the fine frequency-shifted version of the signal of interest is less than the difference between the carrier frequency and the frequency of the coarse frequency-shifted version of the signal of interest.

18. The method according to claim 12, wherein producing the fine frequency-shifted version of the signal of interest comprises:
generating an intermediate frequency estimate, wherein a difference between the carrier frequency and the intermediate frequency estimate is less than the difference between the carrier frequency and the frequency of the coarse frequency-shifted version of the signal of interest;
correlating the coarse frequency-shifted version of the signal of interest with a plurality of unique words over a predetermined correlation period, generating a plurality of correlation values corresponding with each of the plurality of unique words, and generating a plurality of phase estimates based on a plurality of peak correlation values, each peak correlation value corresponding with one of the plurality of unique words;
generating a fine frequency estimate of the carrier frequency based on the intermediate frequency estimate and the plurality of phase estimates using a frequency estimate through phase estimate method; and
correcting a frequency error in the coarse frequency-shifted version of the signal of interest based on the fine frequency estimate, and generating the fine frequency-shifted version of the signal of interest,
wherein a difference between the carrier frequency and a frequency of the fine frequency-shifted version of the signal of interest is less than the difference between the carrier frequency and the frequency of the coarse frequency-shifted version of the signal of interest.

19. The method according to claim 18, wherein generating the intermediate frequency estimate is based on a frequency of a spectral peak of the coarse frequency-shifted version of the signal of interest.

20. The method according to claim 18, wherein generating the fine frequency estimate includes resolving phase ambiguity of the plurality of phase estimates based on the intermediate frequency estimate.

21. A receiver for a communication system, the receiver comprising:
a matched filter configured to extract a signal of interest from a received signal that includes data that is encoded;
a carrier recovery system comprising
means for generating frequency-shifted versions of the signal of interest, correlating at least two of the frequency-shifted versions of the signal of interest with a predetermined unique word in a plurality of correlators to produce at least two correlation values, and outputting a selected one of the frequency-shifted versions of the signal of interest as a coarse frequency-shifted version of the signal of interest based on all of the correlation values, and
means for frequency shifting the coarse frequency-shifted version of the signal of interest to produce a fine frequency-shifted version of the signal of interest; and
a decoder configured to decode the data from the fine frequency-shifted version of the signal of interest.

22. A non-transitory computer-readable storage medium that stores computer program instructions which, when executed by a computer, cause the computer to execute a method of decoding data from a received signal comprising:
extracting a signal of interest from the received signal;
generating a plurality of frequency-shifted versions of the signal of interest by shifting the signal of interest;
correlating at least two of the frequency-shifted versions of the signal of interest with a predetermined unique word to generate at least two correlation values;
outputting a selected one of the frequency-shifted versions of the signal of interest as a coarse frequency-shifted version of the signal of interest based on all of the correlation values;
frequency shifting the coarse frequency-shifted version of the signal of interest to produce a fine frequency-shifted version of the signal of interest; and
decoding the data from the fine frequency-shifted version of the signal of interest.

23. A receiver for a communication system, the receiver comprising:
a matched filter configured to extract a signal of interest from a received signal that includes data that is encoded;
a correlator configured to output a coarse frequency-shifted version of the signal of interest based on the signal of interest;
a fine frequency estimator configured to frequency shift the coarse frequency-shifted version of the signal of interest to produce a fine frequency-shifted version of the signal of interest, the fine frequency estimator including
a spectral peak search unit configured to locate a spectral peak of the coarse frequency-shifted version of the signal of interest, and output a spectral peak frequency corresponding to the spectral peak; and
an error corrector configured to correct a frequency of the coarse frequency-shifted version of the signal of interest based on the spectral peak frequency output by the spectral peak search unit, and output the fine frequency-shifted version of the signal of interest,
wherein a difference between a carrier frequency of the received signal and a frequency of the fine frequency-shifted version of the signal of interest is less than a difference between the carrier frequency of the received signal and a frequency of the coarse frequency-shifted version of the signal of interest; and
a decoder configured to decode the data from the fine frequency-shifted version of the signal of interest.

24. The receiver according to claim 23, wherein the correlator is configured to correlate the signal of interest with a predetermined unique word, generate a correlation value and output the signal of interest as the coarse frequency-shifted version of the signal of interest when the correlation value exceeds a predetermined threshold.

25. The receiver according to claim 23, wherein the correlator is a multi-correlator configured to generate frequency-shifted versions of the signal of interest, correlate at least two of the frequency-shifted versions of the signal of interest with a predetermined unique word in a plurality of correlators to produce at least two correlation values, and output a selected one of the frequency-shifted versions of the signal of interest as the coarse frequency-shifted version of the signal of interest based on all of the correlation values.

26. The receiver according to claim 25, wherein the multi-correlator comprises:
a plurality of parallel shifters, each shifter configured to generate a different one of the frequency-shifted versions of the signal of interest according to a different shift amount;
a shift setting device configured to set the different shift amount corresponding to each of the frequency-shifted versions of the signal of interest as a multiple of a frequency delta $\Delta f$ corresponding to a maximum frequency capture range and a number of the correlators, according to the following equation $\Delta f$=(maximum tolerable frequency error of a demodulator of the receiver)/(the number of the correlators);

a correlation selector configured to select a highest correlation value and a second highest correlation value from the at least two correlation values;
a signal selector configured to output one of the frequency-shifted versions of the signal of interest; and
a threshold unit configured to compare the highest correlation value to the second highest correlation value, select a selected shift amount based on a result of the comparison, and instruct the signal selector to output, as the coarse frequency-shifted version of the signal of interest, a frequency-shifted version of the signal of interest that is shifted by the selected shift amount.

27. The receiver according to claim 26, wherein
a number of the shifters is greater than a number of the correlators,
the shifters generate the frequency-shifted versions of the signal of interest in pairs, one signal of each pair having a frequency increased by a pair shift amount and an other signal of each pair having a frequency decreased by the pair shift amount, from a frequency of the signal of interest,
pairs of frequency-shifted versions of the signal of interest are input to the correlators, a number of pairs of frequency-shifted versions of the signal of interest input to the correlators being less than a total number of pairs of frequency-shifted versions of the signal of interest generated by the shifters,
when the second highest correlation value exceeds a predetermined percentage of the highest correlation value, the threshold unit selects a shift amount of a frequency-shifted version of the signal of interest that was not input to a correlator, and
when the second highest correlation value does not exceed the predetermined percentage of the highest correlation value, the threshold unit selects a shift amount corresponding with a frequency-shifted version of the signal of interest that was input to a correlator and resulted in the highest correlation value.

28. The receiver according to claim 26, wherein
a number of the shifters is greater than a number of the correlators,
the shifters generate the frequency-shifted versions of the signal of interest in pairs, one signal of each pair having a frequency increased by a pair shift amount and an other signal of each pair having a frequency decreased by the pair shift amount, from a frequency of the signal of interest,
pairs of frequency-shifted versions of the signal of interest are input to the correlators, a number of pairs of frequency-shifted versions of the signal of interest input to the correlators being less than a total number of pairs of frequency-shifted versions of the signal of interest generated by the shifters,
when the second highest correlation value exceeds a predetermined percentage of the highest correlation value, the threshold unit instructs the signal selector to output a frequency-shifted version of the signal of interest that is shifted by the multiple of the frequency delta $\Delta f$ from a frequency shift corresponding to the highest correlation value, and
when the second highest correlation value does not exceed the predetermined percentage of the highest correlation value, the threshold unit instructs the signal selector to output a frequency-shifted version of the signal of interest corresponding to the highest correlation value.

29. The receiver according to claim 26, wherein:
Mshft shifters generate Mshft frequency-shifted versions of the signal of interest, where Mshft is an integer value,
Ncorr correlators that correlate Ncorr of the Mshft frequency-shifted versions of the signal of interest, where Ncorr is an integer value and Mshft>Ncorr;
the highest correlation value C0 is output by a correlator with an index k, and the second highest correlation value C1 is output by a correlator with an index j;
when C1 is greater than a predetermined percentage of C0, the threshold unit selects a shift amount of ((Ncorr+1)−k−j)*$\Delta f$; and
when C1 is not greater than a predetermined percentage of C0, the threshold unit selects a shift amount of ((Ncorr+1)−2*k)*$\Delta f$.

30. A method of decoding data from a received signal in a receiver of a communication system, the method comprising:
extracting a signal of interest from the received signal;

generating a coarse frequency-shifted version of the signal of interest based on the signal of interest;
generating a fine frequency-shifted version of the signal of interest by frequency shifting the coarse frequency-shifted version of the signal of interest, the generating including
locating a spectral peak of the coarse frequency-shifted version of the signal of interest, and outputting a spectral peak frequency corresponding to the spectral peak; and
correcting a frequency of the coarse frequency-shifted version of the signal of interest based on the spectral peak frequency, and outputting the fine frequency-shifted version of the signal of interest,
wherein a difference between a carrier frequency of the received signal and a frequency of the fine frequency-shifted version of the signal of interest is less than a difference between the carrier frequency of the received signal and a frequency of the coarse frequency-shifted version of the signal of interest; and
decoding the data from the fine frequency-shifted version of the signal of interest.

31. The method according to claim 30, wherein the generating the coarse frequency-shifted version of the signal of interest includes generating the coarse frequency-shifted version of the signal of interest as the signal of interest when a result of correlating the signal of interest with a predetermined unique word exceeds a predetermined threshold.

32. The method according to claim 30, wherein the generating the coarse frequency-shifted version of the signal of interest includes
generating a plurality of frequency-shifted versions of the signal of interest by shifting the signal of interest;
correlating at least two of the frequency-shifted versions of the signal of interest with a predetermined unique word to generate at least two correlation values; and
outputting a selected one of the frequency-shifted versions of the signal of interest as the coarse frequency-shifted version of the signal of interest based on all of the correlation values.

33. The method according to claim 32, wherein the generating the frequency-shifted versions of the signal of interest comprises:
generating each of the plurality of the frequency-shifted versions of the signal of interest according to a different shift amount;
setting the different shift amount corresponding to each of the frequency-shifted versions of the signal of interest as a multiple of a frequency delta $\Delta f$ corresponding to a maximum frequency capture range and a number of the correlators, according to the following equation $\Delta f$=(maximum tolerable frequency error of a demodulator of the receiver)/(the number of the correlators);

selecting a highest correlation value and a second highest correlation value from the at least two correlation values;
comparing the highest correlation value to the second highest correlation value;
selecting a selected shift amount based on a result of the comparison; and
outputting, as the coarse frequency-shifted version of the signal of interest, a frequency-shifted version of the signal of interest that is shifted by the selected shift amount.

34. The method according to claim 33, wherein the selecting further comprises:
generating the frequency-shifted versions of the signal of interest in pairs, one signal of each pair having a frequency increased by a pair shift amount and an other signal of each pair having a frequency decreased by the pair shift amount, from a frequency of the signal of interest;
correlating pairs of frequency-shifted versions of the signal of interest, a number of pairs of frequency-shifted versions of the signal of interest being correlated is less than a total number of pairs of frequency-shifted versions of the signal of interest generated by the shifting;
when the second highest correlation value exceeds a predetermined percentage of the highest correlation value, selecting a shift amount of a frequency-shifted version of the signal of interest that was not correlated by the correlating; and
when the second highest correlation value does not exceed the predetermined percentage of the highest correlation value, selecting a shift amount corresponding with a frequency-shifted version of the signal of interest that resulted in the highest correlation value.

35. The method according to claim 33, further comprising:
generating the frequency-shifted versions of the signal of interest in pairs, one signal of each pair having a frequency increased by a pair shift amount and an other signal of each pair having a frequency decreased by the pair shift amount, from a frequency of the signal of interest;
correlating pairs of frequency-shifted versions of the signal of interest, a number of pairs of frequency-shifted versions of the signal of interest that are correlated is less than a total number of pairs of frequency-shifted versions of the signal of interest generated by the generating;
when the second highest correlation value exceeds a predetermined percentage of the highest correlation value, outputting a frequency-shifted version of the signal of interest that is shifted by the multiple of the frequency delta $\Delta f$ from a frequency shift corresponding to the highest correlation value; and
when the second highest correlation value does not exceed the predetermined percentage of the highest correlation value, outputting a frequency-shifted version of the signal of interest corresponding to the highest correlation value.

36. The method according to claim 33, further comprising:
generating Mshft frequency-shifted versions of the signal of interest, where Mshft is an integer value;
correlating Ncorr of the Mshft frequency-shifted versions of the signal of interest, where Ncorr is an integer value and Mshft>Ncorr;
outputting the highest correlation value C0 with an index k<Ncorr;
outputting the second highest correlation value C1 with an index j<Ncorr;
selecting a shift amount of ((Ncorr+1)−k−j)*$\Delta f$ when C1 is greater than a predetermined percentage of C0; and
selecting a shift amount of ((Ncorr+1)−2*k)*$\Delta f$ when C1 is not greater than a predetermined percentage of C0.

37. A receiver for a communication system, the receiver comprising:
a matched filter configured to extract a signal of interest from a received signal that includes data that is encoded;

a correlator configured to output a coarse frequency-shifted version of the signal of interest based on the signal of interest;

a fine frequency estimator configured to frequency shift the coarse frequency-shifted version of the signal of interest to produce a fine frequency-shifted version of the signal of interest, the fine frequency estimator including means for locating a spectral peak of the coarse frequency-shifted version of the signal of interest, and outputting a spectral peak frequency corresponding to the spectral peak; and means for correcting a frequency of the coarse frequency-shifted version of the signal of interest based on the spectral peak frequency output by the spectral peak search unit, and outputting the fine frequency-shifted version of the signal of interest, wherein a difference between a carrier frequency of the received signal and a frequency of the fine frequency-shifted version of the signal of interest is less than a difference between the carrier frequency of the received signal and a frequency of the coarse frequency-shifted version of the signal of interest; and a decoder configured to decode the data from the fine frequency-shifted version of the signal of interest.

38. A non-transitory computer-readable storage medium that stores computer program instructions which, when executed by a computer, cause the computer to execute a method of decoding data from a received signal comprising:

extracting a signal of interest from the received signal;

generating a coarse frequency-shifted version of the signal of interest based on the signal of interest;

generating a fine frequency-shifted version of the signal of interest by frequency shifting the coarse frequency-shifted version of the signal of interest, the generating including locating a spectral peak of the coarse frequency-shifted version of the signal of interest, and outputting a spectral peak frequency corresponding to the spectral peak; and correcting a frequency of the coarse frequency-shifted version of the signal of interest based on the spectral peak frequency, and outputting the fine frequency-shifted version of the signal of interest, wherein a difference between a carrier frequency of the received signal and a frequency of the fine frequency-shifted version of the signal of interest is less than a difference between the carrier frequency of the received signal and a frequency of the coarse frequency-shifted version of the signal of interest; and decoding the data from the fine frequency-shifted version of the signal of interest.

39. A receiver for a communication system, the receiver comprising:

a matched filter configured to extract a signal of interest from a received signal that includes data that is encoded;

a correlator configured to output a coarse frequency-shifted version of the signal of interest based on the signal of interest;

a fine frequency estimator configured to frequency shift the coarse frequency-shifted version of the signal of interest to produce a fine frequency-shifted version of the signal of interest, the fine frequency estimator including an intermediate frequency estimator configured to output an intermediate frequency estimate based on a frequency corresponding to a spectral peak of the coarse frequency-shifted version of the signal of interest;

a plurality of phase estimators configured to correlate the coarse frequency-shifted version of the signal of interest with a plurality of unique words over a predetermined correlation period, generate a plurality of correlation values corresponding with each of the plurality of unique words, and generate a plurality of phase estimates based on a plurality of peak correlation values, each peak correlation value corresponding with one of the plurality of unique words;

a fine frequency estimator configured to generate a fine frequency estimate of a carrier frequency of the received signal based on the intermediate frequency estimate and the plurality of phase estimates; and an error corrector configured to correct a frequency of the coarse frequency-shifted version of the signal of interest based on the fine frequency estimate of the carrier frequency of the received signal, and output the fine frequency-shifted version of the signal of interest, wherein a difference between the carrier frequency and a frequency of the fine frequency-shifted version of the signal of interest is less than a difference between the carrier frequency and a frequency of the coarse frequency-shifted version of the signal of interest; and a decoder configured to decode the data from the fine frequency-shifted version of the signal of interest.

40. The receiver according to claim 39, wherein the fine frequency estimator is configured to perform phase unwrapping of the plurality of phase estimates based on the intermediate frequency estimate prior to implementing the frequency estimate through phase estimate technique.

41. The receiver according to claim 39, wherein the plurality of unique words are predetermined unique words in the received signal and the plurality of phase estimates are phase estimates of the centers of the plurality of predetermined unique words.

42. The receiver according to claim 39, wherein the correlator is configured to correlate the signal of interest with a predetermined unique word, generate a correlation value and output the signal of interest as the coarse frequency-shifted version of the signal of interest when the correlation value exceeds a predetermined threshold.

43. The receiver according to claim 39, wherein the correlator is a multi-correlator configured to generate frequency-shifted versions of the signal of interest, correlate at least two of the frequency-shifted versions of the signal of interest with a predetermined unique word in a plurality of correlators to produce at least two correlation values, and output a selected one of the frequency-shifted versions of the signal of interest as the coarse frequency-shifted version of the signal of interest based on all of the correlation values.

44. The receiver according to claim 43, wherein the multi-correlator comprises:

a plurality of parallel shifters, each shifter configured to generate a different one of the frequency-shifted versions of the signal of interest according to a different shift amount;

a shift setting device configured to set the different shift amount corresponding to each of the frequency-shifted versions of the signal of interest as a multiple of a frequency delta $\Delta f$ corresponding to a maximum frequency capture range and a number of the correlators, according to the following equation $\Delta f$=(maximum tolerable frequency error of a demodulator of the receiver)/(the number of the correlators);

a correlation selector configured to select a highest correlation value and a second highest correlation value from the at least two correlation values;

a signal selector configured to output one of the frequency-shifted versions of the signal of interest; and a threshold unit configured to compare the highest correlation value to the second highest correlation value, select a selected shift amount based on a result of the comparison, and instruct the signal selector to output, as the coarse frequency-shifted version of the signal of interest, a frequency-shifted version of the signal of interest that is shifted by the selected shift amount.

45. The receiver according to claim 44, wherein
a number of the shifters is greater than a number of the correlators,
the shifters generate the frequency-shifted versions of the signal of interest in pairs, one signal of each pair having a frequency increased by a pair shift amount and another signal of each pair having a frequency decreased by the pair shift amount, from a frequency of the signal of interest,
pairs of frequency-shifted versions of the signal of interest are input to the correlators, a number of pairs of frequency-shifted versions of the signal of interest input to the correlators being less than a total number of pairs of frequency-shifted versions of the signal of interest generated by the shifters,
when the second highest correlation value exceeds a predetermined percentage of the highest correlation value, the threshold unit selects a shift amount of a frequency-shifted version of the signal of interest that was not input to a correlator, and
when the second highest correlation value does not exceed the predetermined percentage of the highest correlation value, the threshold unit selects a shift amount corresponding with a frequency-shifted version of the signal of interest that was input to a correlator and resulted in the highest correlation value.

46. The receiver according to claim 44, wherein
a number of the shifters is greater than a number of the correlators,
the shifters generate the frequency-shifted versions of the signal of interest in pairs, one signal of each pair having a frequency increased by a pair shift amount and another signal of each pair having a frequency decreased by the pair shift amount, from a frequency of the signal of interest,
pairs of frequency-shifted versions of the signal of interest are input to the correlators, a number of pairs of frequency-shifted versions of the signal of interest input to the correlators being less than a total number of pairs of frequency-shifted versions of the signal of interest generated by the shifters,
when the second highest correlation value exceeds a predetermined percentage of the highest correlation value, the threshold unit instructs the signal selector to output a frequency-shifted version of the signal of interest that is shifted by the multiple of the frequency delta $\Delta f$ from a frequency shift corresponding to the highest correlation value, and
when the second highest correlation value does not exceed the predetermined percentage of the highest correlation value, the threshold unit instructs the signal selector to output a frequency-shifted version of the signal of interest corresponding to the highest correlation value.

47. The receiver according to claim 44, wherein:
Mshft shifters generate Mshft frequency-shifted versions of the signal of interest, where Mshft is an integer value,
Ncorr correlators that correlate Ncorr of the Mshft frequency-shifted versions of the signal of interest, where Ncorr is an integer value and Mshft>Ncorr;
the highest correlation value C0 is output by a correlator with an index k, and the second highest correlation value C1 is output by a correlator with an index j;
when C1 is greater than a predetermined percentage of C0, the threshold unit selects a shift amount of $((Ncorr+1)-k-j)*\Delta f$; and
when C1 is not greater than a predetermined percentage of C0, the threshold unit selects a shift amount of $((Ncorr+1)-2*k)*\Delta f$.

48. A method of decoding data from a received signal in a receiver of a communication system, the method comprising:
extracting a signal of interest from the received signal;
generating a coarse frequency-shifted version of the signal of interest based on the signal of interest;
generating a fine frequency-shifted version of the signal of interest by frequency shifting the coarse frequency-shifted version of the signal of interest, the generating including
generating an intermediate frequency estimate based on a frequency corresponding to a spectral peak of the coarse frequency-shifted version of the signal of interest;
correlating the coarse frequency-shifted version of the signal of interest with a plurality of unique words over a predetermined correlation period, generating a plurality of correlation values corresponding with each of the plurality of unique words, and generating a plurality of phase estimates based on a plurality of peak correlation values, each peak correlation value corresponding with one of the plurality of unique words;
generating a fine frequency estimate of a carrier frequency of the received signal based on the intermediate frequency estimate and the plurality of phase estimates using a frequency estimate through phase estimate method; and
correcting a frequency of the coarse frequency-shifted version of the signal of interest based on the fine frequency estimate of the carrier frequency of the received signal, and outputting the fine frequency-shifted version of the signal of interest,
wherein a difference between the carrier frequency and a frequency of the fine frequency-shifted version of the signal of interest is less than a difference between the carrier frequency and a frequency of the coarse frequency-shifted version of the signal of interest; and
decoding the data from the fine frequency-shifted version of the signal of interest.

49. The method according to claim 48, wherein the step of generating the fine frequency estimate includes unwrapping phases of the plurality of phase estimates based on the intermediate frequency estimate.

50. The method according to claim 48, wherein the plurality of unique words are predetermined unique words in the received signal and the plurality of phase estimates are phase estimates of the centers of the plurality of predetermined unique words.

51. The method according to claim 48, wherein the generating the coarse frequency-shifted version of the signal of interest includes generating the coarse frequency-shifted version of the signal of interest as the signal of interest when a result of correlating the signal of interest with a predetermined unique word exceeds a predetermined threshold.

52. The method according to claim 48, wherein the generating the coarse frequency-shifted version of the signal of interest includes
  generating a plurality of frequency-shifted versions of the signal of interest by shifting the signal of interest;
  correlating at least two of the frequency-shifted versions of the signal of interest with a predetermined unique word to generate at least two correlation values; and
  outputting a selected one of the frequency-shifted versions of the signal of interest as the coarse frequency-shifted version of the signal of interest based on all of the correlation values.

53. The method according to claim 52, wherein the generating the frequency-shifted versions of the signal of interest comprises:
  generating each of the plurality of the frequency-shifted versions of the signal of interest according to a different shift amount;
  setting the different shift amount corresponding to each of the frequency-shifted versions of the signal of interest as a multiple of a frequency delta $\Delta f$ corresponding to a maximum frequency capture range and a number of the correlators, according to the following equation $\Delta f$=(maximum tolerable frequency error of a demodulator of the receiver)/(the number of the correlators);

selecting a highest correlation value and a second highest correlation value from the at least two correlation values;
  comparing the highest correlation value to the second highest correlation value;
  selecting a selected shift amount based on a result of the comparison; and
  outputting, as the coarse frequency-shifted version of the signal of interest, a frequency-shifted version of the signal of interest that is shifted by the selected shift amount.

54. The method according to claim 53, wherein the selecting further comprises:
  generating the frequency-shifted versions of the signal of interest in pairs, one signal of each pair having a frequency increased by a pair shift amount and an other signal of each pair having a frequency decreased by the pair shift amount, from a frequency of the signal of interest;
  correlating pairs of frequency-shifted versions of the signal of interest, a number of pairs of frequency-shifted versions of the signal of interest being correlated is less than a total number of pairs of frequency-shifted versions of the signal of interest generated by the shifting;
  when the second highest correlation value exceeds a predetermined percentage of the highest correlation value, selecting a shift amount of a frequency-shifted version of the signal of interest that was not correlated by the correlating; and
  when the second highest correlation value does not exceed the predetermined percentage of the highest correlation value, selecting a shift amount corresponding with a frequency-shifted version of the signal of interest that resulted in the highest correlation value.

55. The method according to claim 53, further comprising:
  generating the frequency-shifted versions of the signal of interest in pairs, one signal of each pair having a frequency increased by a pair shift amount and an other signal of each pair having a frequency decreased by the pair shift amount, from a frequency of the signal of interest;
  correlating pairs of frequency-shifted versions of the signal of interest, a number of pairs of frequency-shifted versions of the signal of interest that are correlated is less than a total number of pairs of frequency-shifted versions of the signal of interest generated by the generating;
  when the second highest correlation value exceeds a predetermined percentage of the highest correlation value, outputting a frequency-shifted version of the signal of interest that is shifted by the multiple of the frequency delta $\Delta f$ from a frequency shift corresponding to the highest correlation value; and
  when the second highest correlation value does not exceed the predetermined percentage of the highest correlation value, outputting a frequency-shifted version of the signal of interest corresponding to the highest correlation value.

56. The method according to claim 53, further comprising:
  generating Mshft frequency-shifted versions of the signal of interest, where Mshft is an integer value;
  correlating Ncorr of the Mshft frequency-shifted versions of the signal of interest, where Ncorr is an integer value and Mshft>Ncorr;
  outputting the highest correlation value C0 with an index k<Ncorr;
  outputting the second highest correlation value C1 with an index j<Ncorr;
  selecting a shift amount of ((Ncorr+1)−k−j)*$\Delta f$ when C1 is greater than a predetermined percentage of C0; and
  selecting a shift amount of ((Ncorr+1)−2*k)*$\Delta f$ when C1 is not greater than a predetermined percentage of C0.

57. A receiver for a communication system, the receiver comprising:
  a matched filter configured to extract a signal of interest from a received signal that includes data that is encoded;
  a correlator configured to output a coarse frequency-shifted version of the signal of interest based on the signal of interest;
  a fine frequency estimator configured to frequency shift the coarse frequency-shifted version of the signal of interest to produce a fine frequency-shifted version of the signal of interest, the fine frequency estimator including
    means for outputting an intermediate frequency estimate based on a frequency corresponding to a spectral peak of the coarse frequency-shifted version of the signal of interest;
    means for correlating the coarse frequency-shifted version of the signal of interest with a plurality of unique words over a predetermined correlation period, generating a plurality of correlation values corresponding with each of the plurality of unique words, and generating a plurality of phase estimates based on a plurality of peak correlation values, each peak correlation value corresponding with one of the plurality of unique words;
    means for generating a fine frequency estimate of a carrier frequency of the received signal based on the intermediate frequency estimate and the plurality of phase estimates; and
    means for correcting a frequency of the coarse frequency-shifted version of the signal of interest based on the fine frequency estimate of the carrier frequency of the received signal, and outputting the fine frequency-shifted version of the signal of interest, wherein a difference between the carrier frequency and a frequency of the fine frequency-shifted version of the signal of interest is less than a difference between the carrier frequency and a frequency of the coarse frequency-shifted version of the signal of interest; and a decoder configured to decode the data from the fine frequency-shifted version of the signal of interest.

58. A non-transitory computer-readable storage medium that stores computer program instructions which, when executed by a computer, cause the computer to execute a method of decoding data from a received signal comprising:

extracting a signal of interest from the received signal;

generating a coarse frequency-shifted version of the signal of interest based on the signal of interest;

generating a fine frequency-shifted version of the signal of interest by frequency shifting the coarse frequency-shifted version of the signal of interest, the generating including generating an intermediate frequency estimate based on a frequency corresponding to a spectral peak of the coarse frequency-shifted version of the signal of interest;

correlating the coarse frequency-shifted version of the signal of interest with a plurality of unique words over a predetermined correlation period, generating a plurality of correlation values corresponding with each of the plurality of unique words, and generating a plurality of phase estimates based on a plurality of peak correlation values, each peak correlation value corresponding with one of the plurality of unique words;

generating a fine frequency estimate of a carrier frequency of the received signal based on the intermediate frequency estimate and the plurality of phase estimates using a frequency estimate through phase estimate method; and correcting a frequency of the coarse frequency-shifted version of the signal of interest based on the fine frequency estimate of the carrier frequency of the received signal, and outputting the fine frequency-shifted version of the signal of interest, wherein a difference between the carrier frequency and a frequency of the fine frequency-shifted version of the signal of interest is less than a difference between the carrier frequency and a frequency of the coarse frequency-shifted version of the signal of interest; and decoding the data from the fine frequency-shifted version of the signal of interest.

* * * * *